US009481759B2

(12) United States Patent
Herrington et al.

(10) Patent No.: US 9,481,759 B2
(45) Date of Patent: *Nov. 1, 2016

(54) POLYURETHANES DERIVED FROM HIGHLY REACTIVE REACTANTS AND COAL ASH

(75) Inventors: Ronald M. Herrington, Brazoria, TX (US); Kengqing Jian, Jersey City, NJ (US); Russell L. Hill, San Antonio, TX (US)

(73) Assignee: BORAL IP HOLDINGS LLC, Roswell, GA (US)

( * ) Notice: Subject to any disclaimer, the term of this patent is extended or adjusted under 35 U.S.C. 154(b) by 340 days.

This patent is subject to a terminal disclaimer.

(21) Appl. No.: 12/855,368

(22) Filed: Aug. 12, 2010

(65) Prior Publication Data

US 2011/0086931 A1    Apr. 14, 2011

Related U.S. Application Data

(60) Provisional application No. 61/234,122, filed on Aug. 14, 2009.

(51) Int. Cl.
| | | |
|---|---|---|
| *C08G 18/42* | (2006.01) | |
| *C08G 18/66* | (2006.01) | |
| *C08G 18/76* | (2006.01) | |
| *C04B 26/16* | (2006.01) | |
| *C08G 101/00* | (2006.01) | |

(52) U.S. Cl.
CPC .......... *C08G 18/4288* (2013.01); *C04B 26/16* (2013.01); *C08G 18/6662* (2013.01); *C08G 18/7664* (2013.01); *C08G 2101/0008* (2013.01); *C08G 2101/0025* (2013.01); *C08G 2101/0066* (2013.01); *C08G 2101/0083* (2013.01); *Y02W 30/91* (2015.05); *Y02W 30/92* (2015.05)

(58) Field of Classification Search
CPC .......... C08G 18/4288; C08G 18/6662; C08G 18/7664; C08G 2101/0066; C08G 2101/0083; C08G 2101/0025; C08G 2101/0008; Y02W 30/92; Y02W 30/91; C04B 14/022; C04B 14/043; C04B 14/048; C04B 14/06; C04B 14/10; C04B 14/303; C04B 14/368; C04B 14/38; C04B 14/42; C04B 14/46; C04B 16/06; C04B 18/0409; C04B 18/08; C04B 22/064; C04B 22/145; C04B 26/16; C04B 38/02
USPC ......... 521/99, 122, 123, 170, 172, 173, 174; 524/65, 443, 705, 789; 528/74.7, 80, 528/85
See application file for complete search history.

(56) References Cited

U.S. PATENT DOCUMENTS

| | | | |
|---|---|---|---|
| 529,535 | A | 11/1894 | Smith |
| 529,538 | A | 11/1894 | Vaughn |
| 2,526,033 | A | 10/1950 | Lyon |
| 2,817,875 | A | 12/1957 | Harris et al. |
| 2,833,730 | A | 5/1958 | Barthel, Jr. |
| RE24,514 | E | 8/1958 | Hoppe et al. |
| 2,902,388 | A | 9/1959 | Szukiewicz |
| 2,983,693 | A | 5/1961 | Sievers |
| 3,065,500 | A | 11/1962 | Berner |
| 3,071,297 | A | 1/1963 | Lee |
| 3,078,240 | A | 2/1963 | Hoshino et al. |
| 3,078,512 | A | 2/1963 | De Haven |
| 3,178,490 | A | 4/1965 | Petrino et al. |
| 3,182,104 | A | 5/1965 | Cwik |
| 3,223,027 | A | 12/1965 | Soda et al. |
| 3,262,151 | A | 7/1966 | Berton Oxel |
| 3,269,961 | A | 8/1966 | Bruson et al. |
| 3,308,218 | A | 3/1967 | Wiegand et al. |
| 3,466,705 | A | 9/1969 | Richie |
| 3,528,126 | A | 9/1970 | Ernst et al. |
| 3,566,448 | A | 3/1971 | Ernst |
| 3,608,008 | A | 9/1971 | Soukup et al. |
| 3,644,168 | A | 2/1972 | Bonk et al. |
| 3,698,731 | A | 10/1972 | Jost et al. |
| 3,726,624 | A | 4/1973 | Schwarz |
| 3,728,288 | A | 4/1973 | Cobbs, Jr. et al. |
| 3,736,081 | A | 5/1973 | Yovanvich |

(Continued)

FOREIGN PATENT DOCUMENTS

| | | |
|---|---|---|
| CA | 2037130 | 1/2006 |
| CN | 1251596 | 4/2000 |

(Continued)

OTHER PUBLICATIONS

Cayli et al., "Soybean Oil Based Isocyanates: Synthesis, Characterizations, and Polymerizations," Conference Abstract, 2nd Workshop on Fats and Oils as Renewable Feedstock for the Chemical Industry, Mar. 22-24, 2009.

(Continued)

*Primary Examiner* — John Cooney
(74) *Attorney, Agent, or Firm* — Meunier Carlin & Curfman LLC

(57) ABSTRACT

Composite materials and methods for their preparation are described herein. The composite materials include a polyurethane made from the reaction of at least one isocyanate and at least one polyol, and coal ash (e.g., fly ash). The composite materials are highly reactive systems such as through the use of highly reactive polyols, highly reactive isocyanates, or both. The coal ash is present in amounts from about 40% to about 90% by weight of the composite material. Also described is a method of preparing a composite material, including mixing at least one isocyanate, at least one polyol, coal ash, and a catalyst.

32 Claims, 5 Drawing Sheets

(56) References Cited

U.S. PATENT DOCUMENTS

| | | |
|---|---|---|
| 3,738,895 A | 6/1973 | Paymal |
| 3,764,247 A | 10/1973 | Garrett et al. |
| 3,768,937 A | 10/1973 | Haga et al. |
| 3,774,428 A | 11/1973 | Derry et al. |
| 3,802,582 A | 4/1974 | Brock |
| 3,816,043 A | 6/1974 | Snelling et al. |
| 3,819,574 A | 6/1974 | Brown et al. |
| 3,824,057 A | 7/1974 | Kornylak et al. |
| 3,830,776 A | 8/1974 | Carlson et al. |
| 3,832,429 A | 8/1974 | Charpentier |
| 3,841,390 A | 10/1974 | DiBenedetto et al. |
| 3,843,757 A | 10/1974 | Ehrenfreund et al. |
| 3,852,387 A | 12/1974 | Bortnick et al. |
| 3,867,494 A | 2/1975 | Rood et al. |
| 3,878,027 A | 4/1975 | Troutner |
| 3,890,077 A | 6/1975 | Holman |
| 3,910,179 A | 10/1975 | Troutner |
| 3,917,547 A | 11/1975 | Massey |
| 3,917,571 A | 11/1975 | Olstowski et al. |
| 3,917,774 A | 11/1975 | Sagane et al. |
| 3,928,258 A | 12/1975 | Alexander |
| 3,963,679 A | 6/1976 | Ullrich et al. |
| 3,981,654 A | 9/1976 | Rood et al. |
| 3,991,005 A | 11/1976 | Wallace |
| 3,999,230 A | 12/1976 | Bruning et al. |
| 4,005,035 A | 1/1977 | Deaver |
| 4,025,257 A | 5/1977 | Sagane et al. |
| 4,042,314 A | 8/1977 | Bruning et al. |
| 4,051,742 A | 10/1977 | Johansson et al. |
| 4,060,579 A | 11/1977 | Schmitzer et al. |
| 4,065,410 A | 12/1977 | Schafer et al. |
| 4,073,840 A | 2/1978 | Saidla |
| 4,078,032 A | 3/1978 | Wenner |
| 4,092,276 A | 5/1978 | Narayan |
| 4,104,094 A | 8/1978 | Peterson |
| 4,107,248 A | 8/1978 | Schlieckmann |
| 4,120,626 A | 10/1978 | Keller |
| 4,127,040 A | 11/1978 | Moore et al. |
| 4,128,369 A | 12/1978 | Kemerer |
| 4,137,200 A | 1/1979 | Wood et al. |
| 4,141,862 A | 2/1979 | Raden et al. |
| 4,143,759 A | 3/1979 | Paradis |
| 4,149,840 A | 4/1979 | Tippmann |
| 4,153,768 A | 5/1979 | Blount |
| 4,160,749 A | 7/1979 | Schneider et al. |
| 4,160,853 A | 7/1979 | Ammons |
| 4,163,824 A | 8/1979 | Saidla |
| 4,164,439 A | 8/1979 | Coonrod |
| 4,164,526 A | 8/1979 | Clay et al. |
| 4,165,414 A | 8/1979 | Narayan et al. |
| 4,180,538 A | 12/1979 | Morikawa et al. |
| 4,209,605 A | 6/1980 | Hoy et al. |
| 4,210,572 A | 7/1980 | Herman et al. |
| 4,214,864 A | 7/1980 | Tabler |
| 4,221,877 A | 9/1980 | Cuscurida et al. |
| 4,240,950 A | 12/1980 | von Bonin et al. |
| 4,243,755 A | 1/1981 | Marx et al. |
| 4,246,363 A | 1/1981 | Turner |
| 4,247,656 A | 1/1981 | Janssen |
| 4,248,975 A | 2/1981 | Satterly |
| 4,251,428 A | 2/1981 | Recker et al. |
| 4,254,002 A | 3/1981 | Sperling et al. |
| 4,254,176 A | 3/1981 | Muller et al. |
| 4,256,846 A | 3/1981 | Ohasi et al. |
| 4,260,538 A | 4/1981 | Iseler et al. |
| 4,261,946 A | 4/1981 | Goyert et al. |
| 4,272,377 A | 6/1981 | Gerlach et al. |
| 4,275,033 A | 6/1981 | Schulte et al. |
| 4,276,337 A | 6/1981 | Coonrod |
| 4,282,329 A | 8/1981 | von Bonin et al. |
| 4,282,988 A | 8/1981 | Hulber, Jr. |
| 4,284,826 A | 8/1981 | Aelony |
| 4,290,248 A | 9/1981 | Kemerer et al. |
| 4,300,776 A | 11/1981 | Taubenmann |
| 4,330,494 A | 5/1982 | Iwata et al. |
| 4,331,726 A | 5/1982 | Cleary |
| 4,338,422 A | 7/1982 | Jackson, Jr. et al. |
| 4,339,366 A | 7/1982 | Blount |
| 4,340,681 A | 7/1982 | Reuter et al. |
| 4,342,847 A | 8/1982 | Goyert et al. |
| 4,344,873 A | 8/1982 | Wick |
| 4,347,281 A | 8/1982 | Futcher et al. |
| 4,359,359 A | 11/1982 | Gerlach et al. |
| 4,359,548 A | 11/1982 | Blount |
| 4,366,204 A | 12/1982 | Briggs |
| 4,367,259 A | 1/1983 | Fulmer et al. |
| 4,376,171 A | 3/1983 | Blount |
| 4,381,352 A | 4/1983 | McBrayer |
| 4,382,056 A | 5/1983 | Coonrod |
| 4,383,818 A | 5/1983 | Swannell |
| 4,390,581 A | 6/1983 | Cogswell et al. |
| 4,395,214 A | 7/1983 | Phipps et al. |
| 4,396,791 A | 8/1983 | Mazzoni |
| 4,397,983 A | 8/1983 | Hill et al. |
| 4,412,033 A | 10/1983 | LaBelle et al. |
| 4,414,174 A | 11/1983 | Klempner et al. |
| 4,439,548 A | 3/1984 | Weisman |
| 4,450,133 A | 5/1984 | Cafarelli |
| 4,454,251 A | 6/1984 | Frisch et al. |
| 4,460,737 A | 7/1984 | Evans et al. |
| 4,465,500 A | 8/1984 | Motsinger et al. |
| 4,483,727 A | 11/1984 | Eickman et al. |
| 4,489,023 A | 12/1984 | Proksa |
| 4,512,942 A | 4/1985 | Babbin et al. |
| 4,514,162 A | 4/1985 | Schulz |
| 4,532,098 A | 7/1985 | Campbell et al. |
| 4,540,357 A | 9/1985 | Campbell et al. |
| 4,568,702 A | 2/1986 | Mascioli |
| 4,576,718 A | 3/1986 | Reischl et al. |
| 4,576,974 A | 3/1986 | Carroll et al. |
| 4,581,186 A | 4/1986 | Larson |
| 4,595,709 A | 6/1986 | Reischl |
| 4,597,927 A | 7/1986 | Zeitler et al. |
| 4,600,311 A | 7/1986 | Mourrier et al. |
| 4,604,410 A | 8/1986 | Altenberg |
| 4,636,529 A * | 1/1987 | Crooker .......... C08G 18/4213 521/131 |
| 4,649,162 A | 3/1987 | Roche et al. |
| 4,661,533 A | 4/1987 | Stobby |
| 4,677,157 A | 6/1987 | Jacobs |
| 4,680,214 A | 7/1987 | Frisch et al. |
| 4,714,778 A | 12/1987 | Burgoyne, Jr. et al. |
| 4,717,027 A | 1/1988 | Laure et al. |
| 4,724,250 A | 2/1988 | Schubert et al. |
| 4,728,287 A | 3/1988 | Niems |
| 4,728,288 A | 3/1988 | Niems |
| 4,734,455 A | 3/1988 | Mobley et al. |
| 4,737,524 A | 4/1988 | Ako et al. |
| 4,780,484 A | 10/1988 | Schubert et al. |
| 4,780,498 A | 10/1988 | Goerrissen et al. |
| 4,795,763 A | 1/1989 | Gluck et al. |
| 4,802,769 A | 2/1989 | Tanaka |
| 4,826,429 A | 5/1989 | Niems |
| 4,826,944 A | 5/1989 | Hoefer et al. |
| 4,832,183 A | 5/1989 | Lapeyre |
| 4,835,195 A | 5/1989 | Rayfield et al. |
| 4,855,184 A | 8/1989 | Klun et al. |
| 4,892,891 A | 1/1990 | Close |
| 4,895,352 A | 1/1990 | Stumpf |
| 4,948,859 A | 8/1990 | Echols et al. |
| 4,995,801 A | 2/1991 | Hehl |
| 5,001,165 A | 3/1991 | Canaday et al. |
| 5,010,112 A | 4/1991 | Glicksman et al. |
| 5,028,648 A | 7/1991 | Famili et al. |
| 5,033,860 A | 7/1991 | Nakamura |
| 5,051,222 A | 9/1991 | Marten et al. |
| 5,053,274 A | 10/1991 | Jonas |
| 5,064,293 A | 11/1991 | Nakamura |
| 5,091,436 A | 2/1992 | Frisch et al. |
| 5,094,798 A | 3/1992 | Hewitt |
| 5,096,993 A | 3/1992 | Smith et al. |
| 5,102,918 A | 4/1992 | Moriya |
| 5,102,969 A | 4/1992 | Scheffler et al. |
| 5,114,630 A | 5/1992 | Newman et al. |

(56) References Cited

U.S. PATENT DOCUMENTS

| | | |
|---|---|---|
| 5,149,722 A | 9/1992 | Soukup |
| 5,149,739 A | 9/1992 | Lee |
| 5,159,012 A | 10/1992 | Doesburg et al. |
| 5,166,301 A | 11/1992 | Jacobs |
| 5,167,899 A | 12/1992 | Jezic |
| 5,185,420 A | 2/1993 | Smith et al. |
| 5,186,539 A | 2/1993 | Manser et al. |
| 5,229,138 A | 7/1993 | Carotti |
| 5,240,969 A | 8/1993 | Brown |
| 5,252,697 A | 10/1993 | Jacobs et al. |
| 5,271,699 A | 12/1993 | Barre et al. |
| 5,278,195 A | 1/1994 | Volkert et al. |
| 5,296,545 A | 3/1994 | Heise |
| 5,300,531 A | 4/1994 | Weaver |
| 5,302,634 A | 4/1994 | Mushovic |
| 5,330,341 A | 7/1994 | Kemerer et al. |
| 5,331,044 A | 7/1994 | Lausberg et al. |
| 5,340,300 A | 8/1994 | Saeki et al. |
| 5,344,490 A | 9/1994 | Roosen et al. |
| 5,361,945 A | 11/1994 | Johanson |
| 5,369,147 A | 11/1994 | Mushovic |
| 5,375,988 A | 12/1994 | Klahre |
| 5,424,013 A | 6/1995 | Lieberman |
| 5,424,014 A | 6/1995 | Glorioso et al. |
| 5,432,204 A | 7/1995 | Farkas |
| 5,439,711 A | 8/1995 | Vu et al. |
| 5,453,231 A | 9/1995 | Douglas |
| 5,455,312 A | 10/1995 | Heidingsfeld et al. |
| 5,458,477 A | 10/1995 | Kemerer et al. |
| 5,458,831 A | 10/1995 | Saeki et al. |
| 5,491,174 A | 2/1996 | Grier et al. |
| 5,495,640 A | 3/1996 | Mullet et al. |
| 5,505,599 A | 4/1996 | Kemerer et al. |
| 5,508,315 A | 4/1996 | Mushovic |
| 5,514,430 A | 5/1996 | Andersen et al. |
| 5,522,446 A | 6/1996 | Mullet et al. |
| 5,527,172 A | 6/1996 | Graham, Jr. |
| 5,527,833 A | 6/1996 | Kuczynski et al. |
| 5,532,065 A | 7/1996 | Gubitz et al. |
| 5,536,781 A | 7/1996 | Heidingsfeld et al. |
| 5,554,713 A | 9/1996 | Freeland |
| 5,562,141 A | 10/1996 | Mullet et al. |
| 5,565,497 A | 10/1996 | Godbey et al. |
| 5,566,740 A | 10/1996 | Mullet et al. |
| 5,567,791 A | 10/1996 | Brauer et al. |
| 5,569,713 A | 10/1996 | Lieberman |
| 5,582,840 A | 12/1996 | Pauw et al. |
| 5,582,849 A | 12/1996 | Lupke |
| 5,604,266 A | 2/1997 | Mushovic |
| 5,611,976 A | 3/1997 | Klier et al. |
| 5,621,024 A | 4/1997 | Eberhardt et al. |
| 5,631,103 A | 5/1997 | Eschbach et al. |
| 5,631,319 A | 5/1997 | Reese et al. |
| 5,634,953 A | 6/1997 | Wissmann |
| 5,643,516 A | 7/1997 | Raza et al. |
| 5,681,915 A | 10/1997 | Lechner et al. |
| 5,688,890 A | 11/1997 | Ishiguro et al. |
| 5,696,205 A | 12/1997 | Muller et al. |
| 5,700,495 A | 12/1997 | Kemerer et al. |
| 5,707,474 A | 1/1998 | Andersen et al. |
| 5,710,231 A | 1/1998 | Fogg et al. |
| 5,723,506 A | 3/1998 | Glorioso et al. |
| 5,728,337 A | 3/1998 | Yoshikawa et al. |
| 5,759,695 A | 6/1998 | Primeaux, II |
| 5,760,133 A | 6/1998 | Heidingsfeld et al. |
| 5,769,281 A | 6/1998 | Bates |
| 5,782,283 A | 7/1998 | Kendall |
| 5,783,125 A | 7/1998 | Bastone et al. |
| 5,783,629 A | 7/1998 | Srinivasan et al. |
| 5,795,949 A | 8/1998 | Daute et al. |
| 5,798,533 A | 8/1998 | Fishback et al. |
| 5,811,506 A | 9/1998 | Slagel |
| 5,817,402 A | 10/1998 | Miyake et al. |
| 5,836,499 A | 11/1998 | Mullet et al. |
| 5,837,742 A | 11/1998 | Fishback |
| 5,844,015 A | 12/1998 | Steilen et al. |
| 5,872,168 A | 2/1999 | Katoot |
| 5,908,701 A | 6/1999 | Jennings et al. |
| 5,929,153 A | 7/1999 | Mori et al. |
| 5,932,337 A | 8/1999 | Edinger et al. |
| 5,934,352 A | 8/1999 | Morgan |
| 5,945,460 A | 8/1999 | Ekart et al. |
| 5,952,053 A | 9/1999 | Colby |
| 5,962,144 A | 10/1999 | Primeaux, II |
| 5,981,655 A | 11/1999 | Heidingsfeld et al. |
| 5,993,551 A | 11/1999 | Hahn |
| 6,000,102 A | 12/1999 | Lychou |
| 6,019,269 A | 2/2000 | Mullet et al. |
| 6,020,387 A | 2/2000 | Downey et al. |
| 6,040,381 A | 3/2000 | Jennings et al. |
| 6,051,634 A | 4/2000 | Laas et al. |
| 6,055,781 A | 5/2000 | Johanson |
| 6,060,531 A | 5/2000 | Horn et al. |
| 6,062,719 A | 5/2000 | Busby et al. |
| 6,086,802 A | 7/2000 | Levera et al. |
| 6,096,401 A | 8/2000 | Jenkines |
| 6,103,340 A | 8/2000 | Kubo et al. |
| 6,107,355 A | 8/2000 | Horn et al. |
| 6,107,433 A | 8/2000 | Petrovic et al. |
| 6,120,905 A | 9/2000 | Figovsky |
| 6,133,329 A | 10/2000 | Shieh et al. |
| 6,136,246 A | 10/2000 | Rauwendaal et al. |
| 6,136,870 A | 10/2000 | Triolo et al. |
| 6,140,381 A | 10/2000 | Rosthauser et al. |
| 6,146,556 A | 11/2000 | Katoot |
| 6,177,232 B1 | 1/2001 | Melisaris et al. |
| 6,180,192 B1 | 1/2001 | Smith et al. |
| 6,180,686 B1 | 1/2001 | Kurth |
| RE37,095 E | 3/2001 | Glorioso et al. |
| 6,204,312 B1 | 3/2001 | Taylor |
| 6,211,259 B1 | 4/2001 | Borden et al. |
| 6,220,745 B1 | 4/2001 | Kobayashi et al. |
| 6,224,797 B1 | 5/2001 | Franzen et al. |
| 6,228,933 B1 | 5/2001 | Hiles |
| 6,234,777 B1 | 5/2001 | Sperry et al. |
| 6,235,367 B1 | 5/2001 | Holmes et al. |
| 6,252,031 B1 | 6/2001 | Tsutsumi et al. |
| 6,257,643 B1 | 7/2001 | Young |
| 6,257,644 B1 | 7/2001 | Young |
| 6,258,310 B1 | 7/2001 | Sardanopoli et al. |
| 6,258,917 B1 | 7/2001 | Slagel |
| 6,264,462 B1 | 7/2001 | Gallagher |
| 6,265,457 B1 | 7/2001 | Dolgopolsky et al. |
| 6,271,276 B1 | 8/2001 | Gribble et al. |
| 6,284,841 B1 | 9/2001 | Friesner |
| 6,294,637 B1 | 9/2001 | Brauer et al. |
| 6,297,321 B1 | 10/2001 | Onder et al. |
| 6,309,507 B1 | 10/2001 | Morikawa et al. |
| 6,312,244 B1 | 11/2001 | Levera et al. |
| 6,313,186 B1 | 11/2001 | Kaida et al. |
| 6,321,904 B1 | 11/2001 | Mitchell |
| 6,329,448 B1 | 12/2001 | Gutsche et al. |
| 6,331,577 B1 | 12/2001 | Volkert et al. |
| 6,343,924 B1 | 2/2002 | Klepsch |
| 6,348,514 B1 | 2/2002 | Calabrese et al. |
| 6,372,811 B2 * | 4/2002 | Singh .......... C08G 18/4208 521/131 |
| 6,383,599 B1 | 5/2002 | Bell et al. |
| 6,387,504 B1 | 5/2002 | Mushovic |
| 6,399,698 B1 | 6/2002 | Petrovic et al. |
| 6,409,949 B1 | 6/2002 | Tanaka et al. |
| 6,420,034 B1 | 7/2002 | Takahashi et al. |
| 6,423,755 B1 | 7/2002 | Allen et al. |
| 6,429,257 B1 | 8/2002 | Buxton et al. |
| 6,432,335 B1 | 8/2002 | Ladang et al. |
| 6,433,032 B1 | 8/2002 | Hamilton |
| 6,433,121 B1 | 8/2002 | Petrovic et al. |
| 6,441,534 B2 | 8/2002 | Iino et al. |
| 6,455,605 B1 | 9/2002 | Giorgini et al. |
| 6,455,606 B1 | 9/2002 | Kaku et al. |
| 6,458,866 B1 | 10/2002 | Oppermann et al. |
| 6,465,569 B1 | 10/2002 | Kurth |
| 6,467,610 B1 | 10/2002 | MacLachlan |
| 6,469,667 B2 | 10/2002 | Fox et al. |

(56) References Cited

U.S. PATENT DOCUMENTS

| | | |
|---|---|---|
| 6,485,665 B1 | 11/2002 | Hermanutz et al. |
| 6,486,224 B2 | 11/2002 | Lin et al. |
| 6,508,362 B2 | 1/2003 | Hnatow et al. |
| 6,524,978 B1 | 2/2003 | Moore |
| 6,534,617 B1 | 3/2003 | Batt et al. |
| 6,541,534 B2 | 4/2003 | Allen et al. |
| 6,552,660 B1 | 4/2003 | Lisowski |
| 6,555,199 B1 | 4/2003 | Jenkines |
| 6,571,935 B1 | 6/2003 | Campbell et al. |
| 6,573,309 B1 | 6/2003 | Reitenbach et al. |
| 6,573,354 B1 | 6/2003 | Petrovic et al. |
| 6,578,619 B2 | 6/2003 | Wright |
| 6,579,932 B1 | 6/2003 | Schipper et al. |
| 6,604,848 B2 | 8/2003 | Tanaka et al. |
| 6,605,343 B1 | 8/2003 | Motoi et al. |
| 6,609,638 B1 | 8/2003 | Lott |
| 6,610,756 B1 | 8/2003 | Shimizu et al. |
| 6,613,827 B2 | 9/2003 | Lundgard et al. |
| 6,616,886 B2 | 9/2003 | Peterson et al. |
| 6,617,009 B1 | 9/2003 | Chen et al. |
| 6,624,244 B2 | 9/2003 | Kurth |
| 6,641,384 B2 | 11/2003 | Bosler et al. |
| 6,646,093 B2 | 11/2003 | Tsuruta et al. |
| 6,649,084 B2 | 11/2003 | Morikawa et al. |
| 6,649,667 B2 | 11/2003 | Clatty |
| 6,686,435 B1 | 2/2004 | Petrovic et al. |
| 6,695,902 B2 | 2/2004 | Hemmings et al. |
| 6,706,774 B2 | 3/2004 | Muzenberger et al. |
| 6,709,717 B2 | 3/2004 | Mushovic |
| 6,767,399 B2 | 7/2004 | Peev et al. |
| 6,769,220 B2 | 8/2004 | Friesner |
| 6,777,457 B2 | 8/2004 | Dolgopolsky et al. |
| 6,832,430 B1 | 12/2004 | Ogawa et al. |
| 6,849,676 B1 | 2/2005 | Shibano et al. |
| 6,864,296 B2 | 3/2005 | Kurth |
| 6,864,312 B2 | 3/2005 | Moore |
| 6,867,239 B2 | 3/2005 | Kurth |
| 6,871,457 B2 | 3/2005 | Quntero-Flores et al. |
| 6,881,763 B2 | 4/2005 | Kurth |
| 6,881,764 B2 | 4/2005 | Doesburg et al. |
| 6,903,156 B2 | 6/2005 | Muller et al. |
| 6,908,573 B2 | 6/2005 | Hossan |
| 6,916,863 B2 | 7/2005 | Hemmings et al. |
| 6,958,365 B2 | 10/2005 | Dontula et al. |
| 6,962,636 B2 | 11/2005 | Kurth et al. |
| 6,971,495 B2 | 12/2005 | Hedrick et al. |
| 6,972,144 B2 | 12/2005 | Roth et al. |
| 6,979,477 B2 | 12/2005 | Kurth et al. |
| 6,979,704 B1 | 12/2005 | Mayer et al. |
| 6,989,123 B2 | 1/2006 | Lee et al. |
| 6,997,346 B2 | 2/2006 | Landers et al. |
| 7,037,865 B1 | 5/2006 | Kimberly |
| 7,063,877 B2 | 6/2006 | Kurth et al. |
| 7,098,291 B2 | 8/2006 | Brinkman |
| 7,132,459 B1 | 11/2006 | Buchel |
| 7,160,976 B2 | 1/2007 | Lühmann et al. |
| 7,188,992 B2 | 3/2007 | Mattingly, Jr. |
| 7,196,124 B2 | 3/2007 | Parker et al. |
| 7,199,168 B2 | 4/2007 | Spitler et al. |
| 7,211,206 B2 | 5/2007 | Brown et al. |
| 7,241,818 B2 | 7/2007 | Hemmings et al. |
| 7,267,288 B2 | 9/2007 | Wheeler, Jr. et al. |
| 7,316,559 B2 | 1/2008 | Taylor |
| 7,491,351 B2 | 2/2009 | Taylor et al. |
| 7,651,645 B2 | 1/2010 | Taylor |
| 7,763,341 B2 | 7/2010 | Brown |
| 7,794,224 B2 | 9/2010 | Butteriss |
| 7,794,817 B2 | 9/2010 | Brown |
| 2001/0009683 A1 | 7/2001 | Kitahama et al. |
| 2002/0034598 A1 | 3/2002 | Bonk et al. |
| 2002/0040071 A1 | 4/2002 | Lin et al. |
| 2002/0045048 A1 | 4/2002 | Bonk et al. |
| 2002/0048643 A1 | 4/2002 | Bonk et al. |
| 2002/0086913 A1 | 7/2002 | Roels et al. |
| 2002/0098362 A1 | 7/2002 | Mushovic |
| 2002/0171164 A1 | 11/2002 | Halterbaum et al. |
| 2002/0192456 A1 | 12/2002 | Mashburn et al. |
| 2003/0004232 A1 | 1/2003 | Ruede |
| 2003/0021915 A1 | 1/2003 | Rohatgi et al. |
| 2003/0065045 A1 | 4/2003 | Falke et al. |
| 2003/0080203 A1 | 5/2003 | Roth et al. |
| 2003/0083394 A1 | 5/2003 | Clatty |
| 2003/0090016 A1 | 5/2003 | Petrovic et al. |
| 2003/0134920 A1 | 7/2003 | Poisl et al. |
| 2003/0143910 A1 | 7/2003 | Mashburn et al. |
| 2003/0158365 A1 | 8/2003 | Brauer et al. |
| 2003/0232933 A1 | 12/2003 | Lagneaux et al. |
| 2003/0232956 A1 | 12/2003 | Brinkman |
| 2004/0048055 A1 | 3/2004 | Branca |
| 2004/0049002 A1 | 3/2004 | Andrews et al. |
| 2004/0115415 A1 | 6/2004 | Thiele et al. |
| 2004/0121161 A1 | 6/2004 | Shugert et al. |
| 2004/0132903 A1 | 7/2004 | Doesburg |
| 2004/0144287 A1 | 7/2004 | Tardif et al. |
| 2004/0147627 A1 | 7/2004 | Hager et al. |
| 2004/0176486 A1 | 9/2004 | Glorioso et al. |
| 2004/0198900 A1 | 10/2004 | Madaj |
| 2004/0266993 A1 | 12/2004 | Evans |
| 2005/0011159 A1 | 1/2005 | Standal et al. |
| 2005/0031578 A1 | 2/2005 | Deslauriers et al. |
| 2005/0070620 A1 | 3/2005 | Herrington et al. |
| 2005/0079339 A1 | 4/2005 | Riddle |
| 2005/0131092 A1 | 6/2005 | Kurth et al. |
| 2005/0131093 A1 | 6/2005 | Kurth et al. |
| 2005/0136259 A1 | 6/2005 | Mohanty et al. |
| 2005/0161855 A1 | 7/2005 | Brown et al. |
| 2005/0163969 A1 | 7/2005 | Brown |
| 2005/0171243 A1 | 8/2005 | Hemmings et al. |
| 2005/0182228 A1 | 8/2005 | Kurth |
| 2005/0208167 A1 | 9/2005 | You et al. |
| 2005/0222303 A1 | 10/2005 | Cernohous |
| 2005/0260351 A1 | 11/2005 | Kurth et al. |
| 2005/0281999 A1 | 12/2005 | Hoffmann et al. |
| 2005/0287238 A1 | 12/2005 | Taylor |
| 2006/0003042 A1 | 1/2006 | Inoue et al. |
| 2006/0014891 A1 | 1/2006 | Yang et al. |
| 2006/0041155 A1 | 2/2006 | Casper |
| 2006/0041156 A1 | 2/2006 | Casper et al. |
| 2006/0045899 A1 | 3/2006 | Sarangapani |
| 2006/0071369 A1 | 4/2006 | Butteriss |
| 2006/0105145 A1 | 5/2006 | Brown |
| 2006/0115625 A1 | 6/2006 | Brown |
| 2006/0186571 A1 | 8/2006 | Brown |
| 2006/0186572 A1 | 8/2006 | Brown |
| 2006/0217517 A1 | 9/2006 | Daly |
| 2006/0251881 A1 | 11/2006 | Gilder |
| 2006/0269738 A1 | 11/2006 | Kimberly |
| 2006/0270747 A1 | 11/2006 | Griggs |
| 2006/0273486 A1 | 12/2006 | Taylor et al. |
| 2006/0276609 A1 | 12/2006 | Lysenko et al. |
| 2006/0293428 A1 | 12/2006 | Singh et al. |
| 2007/0026142 A1 | 2/2007 | Singh et al. |
| 2007/0027227 A1 | 2/2007 | Shutov |
| 2007/0036975 A1 | 2/2007 | Miele et al. |
| 2007/0037953 A1 | 2/2007 | Geiger et al. |
| 2007/0052128 A1 | 3/2007 | Taylor |
| 2007/0056875 A1 | 3/2007 | Hlady et al. |
| 2007/0066697 A1 | 3/2007 | Gilder et al. |
| 2007/0083003 A1 | 4/2007 | Gupta |
| 2007/0155863 A1 | 7/2007 | Mohanty et al. |
| 2007/0213456 A1 | 9/2007 | Singh et al. |
| 2007/0222105 A1 | 9/2007 | Brown |
| 2007/0222106 A1 | 9/2007 | Brown |
| 2007/0225391 A1 | 9/2007 | Brown |
| 2007/0225419 A1 | 9/2007 | Brown |
| 2007/0275227 A1 | 11/2007 | Mashburn et al. |
| 2008/0029925 A1 | 2/2008 | Brown |
| 2008/0114086 A1 | 5/2008 | Lorenz et al. |
| 2008/0132611 A1 | 6/2008 | Brown |
| 2008/0237914 A1 | 10/2008 | Lustiger et al. |
| 2009/0011671 A1 | 1/2009 | Doesburg et al. |
| 2009/0110869 A1 | 4/2009 | Streeton et al. |
| 2009/0198036 A1 | 8/2009 | Duffy |
| 2009/0295021 A1 | 12/2009 | Brown |

(56) References Cited

U.S. PATENT DOCUMENTS

| | | | |
|---|---|---|---|
| 2010/0025882 A1 | 2/2010 | Taylor et al. |
| 2010/0201014 A1 | 8/2010 | Taylor |
| 2010/0230852 A1 | 9/2010 | Brown |
| 2010/0240785 A1 | 9/2010 | Hickey et al. |
| 2010/0264559 A1 | 10/2010 | Brown |
| 2010/0292397 A1 | 11/2010 | Brown |
| 2010/0296361 A1 | 11/2010 | Brown |
| 2011/0002190 A1 | 1/2011 | Tardif |

FOREIGN PATENT DOCUMENTS

| | | |
|---|---|---|
| CN | 1052991 | 5/2000 |
| CN | 1926282 | 3/2007 |
| DE | 2351844 | 4/1975 |
| DE | 2713984 | 10/1978 |
| DE | 2714006 | 10/1978 |
| DE | 2740504 | 3/1979 |
| DE | 3839986 | 5/1990 |
| DE | 19528938 | 2/1997 |
| DE | 102006021266 | 11/2006 |
| DE | 102008063815 | 6/2010 |
| DE | 202008016807 | 6/2010 |
| EP | 0115374 A2 | 8/1984 |
| EP | 0654297 | 5/1995 |
| EP | 0771827 | 5/1997 |
| EP | 0911453 | 4/1999 |
| EP | 1 336 461 | 5/2002 |
| EP | 1201703 | 5/2002 |
| EP | 1921098 | 5/2008 |
| EP | 1921099 | 5/2008 |
| EP | 1927535 | 6/2008 |
| GB | 790527 | 2/1958 |
| GB | 1152306 | 5/1969 |
| GB | 1246940 | 9/1971 |
| GB | 1314707 | 4/1973 |
| GB | 2300627 | 11/1996 |
| GB | 2306909 | 5/1997 |
| GB | 2347933 | 9/2000 |
| JP | 355080456 | 6/1980 |
| JP | 56007637 | 1/1981 |
| JP | 58132533 | 8/1983 |
| JP | 60002329 | 1/1985 |
| JP | 61081757 | 4/1986 |
| JP | 61209124 | 9/1986 |
| JP | 63-22819 | 1/1988 |
| JP | 63022819 | 1/1988 |
| JP | 63202408 | 8/1988 |
| JP | 4037506 | 2/1992 |
| JP | 5237913 | 9/1993 |
| JP | 5237914 | 9/1993 |
| JP | 5261796 | 10/1993 |
| JP | 05285941 | 11/1993 |
| JP | 6001252 | 1/1994 |
| JP | 6129742 | 5/1994 |
| JP | 6261669 | 9/1994 |
| JP | 07076395 | 3/1995 |
| JP | 07313941 | 12/1995 |
| JP | 08188634 | 7/1996 |
| JP | 11005245 | 1/1999 |
| JP | 11171960 | 6/1999 |
| JP | 2001326361 | 11/2001 |
| JP | 2004131654 | 4/2004 |
| JP | 2005138567 | 6/2005 |
| KR | 2002086327 | 11/2002 |
| NZ | 226301 | 3/1990 |
| WO | 81/03026 | 10/1981 |
| WO | 87/05541 | 9/1987 |
| WO | 91/00304 | 1/1991 |
| WO | 92/07892 | 5/1992 |
| WO | 93/19110 | 9/1993 |
| WO | 93/24549 | 12/1993 |
| WO | 94/25529 | 11/1994 |
| WO | 94/27697 | 12/1994 |
| WO | 95/18185 | 7/1995 |
| WO | 97/11114 | 3/1997 |
| WO | 97/44373 | 11/1997 |
| WO | 98/08893 | 3/1998 |
| WO | 99/37592 | 7/1999 |
| WO | 99/39891 | 8/1999 |
| WO | 00/04082 | 1/2000 |
| WO | 00/17249 | 3/2000 |
| WO | 00/64993 | 11/2000 |
| WO | 01/72863 | 10/2001 |
| WO | 01/94470 | 12/2001 |
| WO | 02/01530 | 1/2002 |
| WO | 2004/065469 | 8/2004 |
| WO | 2004/078900 | 9/2004 |
| WO | 2004/113248 | 12/2004 |
| WO | 2005/006349 | 1/2005 |
| WO | 2005/053938 | 6/2005 |
| WO | 2005/056267 | 6/2005 |
| WO | 2005/072187 | 8/2005 |
| WO | 2005/072188 | 8/2005 |
| WO | 2005/094255 | 10/2005 |
| WO | 2005/123798 | 12/2005 |
| WO | 2006/012149 | 2/2006 |
| WO | 2006/114430 | 11/2006 |
| WO | 2006/118995 | 11/2006 |
| WO | 2006/137672 | 12/2006 |
| WO | 2007/014332 | 2/2007 |
| WO | 2007/087175 | 8/2007 |
| WO | 2007/112104 | 10/2007 |
| WO | 2007/112105 | 10/2007 |
| WO | 2008/110222 | 9/2008 |
| WO | 2008/127934 | 10/2008 |
| WO | 2008/154010 | 12/2008 |
| WO | 2009/045926 | 4/2009 |
| WO | 2009/048927 | 4/2009 |
| WO | 2010/078895 | 7/2010 |

OTHER PUBLICATIONS

Dolui, S.K., "Unusual effect of filler (CaCO3) on thermal degradation of polyurethane," Journal of Applied Polymer Science, 53(4): 463-465 (2003).

Hojabri et al., "Fatty Acid-Derived Diisocyanate and Biobased Polyurethane Produced from Vegetable Oil: Synthesis, Polymerization, and Characterization," Biomacromolecules, 10(4):884-891 (2009), abstract.

Horvath Jr., M., "Structural Polyurethane Foam Reaction Injection Molding," Journal of Cellular Plastics, September/ October, pp. 289-293, 1976.

Inukai et al., "Glass Fiber Reinforced Rigid Polyurethane Foam (Elson Neo-Lumber FFU)," International Progress in Urethanes, vol. 5, Lancaster, PA, Technomic Publishing Co., Inc., 1988.

Morimoto et al., "Continuous Glass Fiber Reinforced Rigid Polyurethane Foam (Airlite FRU)," Internatinoal Progress in Urethanes, vol. 5, Lancaster, PA, Technomic Publishing Co., Inc., 1988.

Okagawa et al., "Glass Fibre Reinforced Rigid Polyurethane Foam, Cellular and non cellular polyurethanes," Carl Hanser Verlag Munchen Wien Druck and Bindung, Germany, p. 453-467, 1980.

Okagawa, F., "Glass Fiber Reinforced Rigid Polyurethane Foam", International Progress in Urethane, vol. 2, Lancaster, PA, Technomic Publishing Co., Inc., 1980.

"Soya-based isocyanate alternatives coming? (us newslines)," Urethanes Technology, Apr. 1, 2007, abstract.

Guhanathan, S. et al., "Studies on Castor Oil-based Polyurethane/ Polyacrylonitrile Interpenetrating Polymer Network for Toughening of Unsaturated Polyester Resin," Journal of Applied Polymer Science, 92:817-829 (2004).

Javni, I. et al., "Thermal Stability of Polyurethanes Based on Vegetable Oils," Journal of Applied Polymer Science, 77:1723-1734 (2000).

Nayak, P.L., "Natural Oil-Based Polymers: Opportunities and Challenges," J. Macro. Sci. Rev. Macro. Chem. & Phys., C40(1):1-21 (2000).

(56) References Cited

OTHER PUBLICATIONS

International Search Report and Written Opinion, mailed Sep. 24, 2010 in the co-pending related International Application No. PCT/US2010/045466, 8 pages.
Co-pending related U.S. Appl. No. 12/855,382, filed Aug. 12, 2010.
Co-pending, related U.S. Appl. No. 12/855,380, filed Aug. 12, 2010.
Co-pending, related U.S. Appl. No. 12/855,372, filed Aug. 12, 2010.
Anonymous. "Rigid polyurethane foams having a strut/window mass ratio in the range of 90/10 to 10/90, made via extrusion." Research Disclosure. Journal No. 40264, Published Oct. 1997.
Anonymous. "Cellular plastics made by extrusion." Research Disclosure. Journal No. 40204, Published Oct. 1997.
Szycher, Michael. 17.7.1 Foam Production by Extruder Method. Szycher's Handbook of Polyurethanes. pp. 17-21-17-22. Copyright 1999 by CRC Press LLC.
Standard Practice for Polyurethane Raw Materials: Polyurethane Foam Cup Test, ASTM D7487-08, 2008.
International Preliminary Report on Patentability, mailed Oct. 24, 2011 in the co-pending related International Application No. PCT/US2010/045466, 6 pages.

* cited by examiner

POLYURETHANES DERIVED FROM HIGHLY REACTIVE REACTANTS AND COAL ASH

CROSS-REFERENCE TO RELATED APPLICATIONS

This application claims priority to U.S. Provisional Application No. 61/234,122, filed Aug. 14, 2009, which is incorporated herein by reference in its entirety.

BACKGROUND

Polymeric composite materials that contain organic or inorganic filler materials have become desirable for a variety of uses because of their excellent mechanical properties and weathering stability. Foamed versions of these materials can be relatively low density yet the filler materials can provide a composite material that is extremely strong. The polymer provided in the composite material can help provide good toughness (i.e., resistance to brittle fracture) and resistance to degradation from weathering to the composite when it is exposed to the environment. Thus, polymeric composite materials including organic or inorganic fillers can be used in a variety of applications.

SUMMARY

Composite materials and methods for their preparation are described. The composite materials include a polyurethane formed by the reaction of at least one isocyanate and at least one polyol, and coal ash. The coal ash can be, for example, fly ash. The isocyanates used in these composites are selected from the group consisting of diisocyanates, polyisocyanates, and mixtures thereof. The composite materials are formed using in highly reactive systems that can include highly reactive polyols, isocyanates, or both. The coal ash is present, e.g., in an amount from about 40% to about 90% by weight coal ash based on the total weight of the composite. The highly reactive polyurethane systems do not experience scorching or the other issues associated with highly reactive polyurethane systems.

In some embodiments, the composite material can be foamed. The composite material can also be formed using a crosslinker such as glycerin. The polyurethane component of the composite material can have a total environmental content of greater than 35% and/or the composite material can have a total environmental content of greater than 75%. In some embodiments, the composite material further includes fibers such as glass fibers. The composite material can be used to form a building material such as siding material, carpet backing, building panels, and roofing material.

In some embodiments, the at least one polyol includes 50% or more of one or more highly reactive polyols. The highly reactive polyol can include a soybean oil-based polyol. For example, the soybean oil-based polyol can be formed by the reaction of a soybean oil and a polyester, e.g., a recycled polyester. In some embodiments, the highly reactive polyol has a hydroxyl number of greater than 300 mg KOH/g.

In some embodiments, the at least one polyol includes 50% or more of one or more highly reactive polyols, the one or more highly reactive polyols each comprising 75% or more primary hydroxyl groups based on the total number of hydroxyl groups in the polyol.

In some embodiments or in addition to the embodiments described above, the at least one polyol includes 50% or more of one or more highly reactive polyols, the one or more highly reactive polyols each having a primary hydroxyl number, defined as the hydroxyl number multiplied by the percentage of primary hydroxyl groups based on the total number of hydroxyl groups in the polyol, of greater than 250.

In some embodiments or in addition to the embodiments described above, the at least one polyol includes 50% or more of one or more highly reactive polyols, each highly reactive polyol when replacing the polyols used in the standard polyurethane formulation of the Brookfield Viscosity Test produces a Brookfield viscosity of over 50,000 mPa·s in less than 225 seconds.

In some embodiments or in addition to the embodiments described above, the at least one isocyanate, at least one polyol, and at least one catalyst when mixed together and used as the polyurethane in the Brookfield Viscosity Test produces a Brookfield viscosity of over 50,000 mPa·s in less than 225 seconds.

In some embodiments or in addition to the embodiments described above, wherein the at least one isocyanate, the at least one polyol, the at least one catalyst, and any non-filler additives when mixed together in the amounts used in the polyurethane without fly ash or other fillers produce a surface temperature rise in a cup test of at least 120° F.

In some embodiments or in addition to the embodiments described above, the at least one isocyanate includes 50% or more of one or more highly reactive isocyanates, each highly reactive isocyanate when replacing the isocyanate used in the standard polyurethane formulation of the Brookfield Viscosity Test produces a Brookfield viscosity of over 50,000 mPa·s in less than 400 seconds.

Methods of preparing a composite material are also described. The method can include mixing (1) at least one isocyanate selected from the group consisting of diisocyanates, polyisocyanates and mixtures thereof, (2) at least one polyol, (3) coal ash, and (4) a catalyst; and allowing the at least one isocyanate and the at least one polyol to react in the presence of the coal ash and catalyst to form the composite material, wherein the amount of coal ash added in the mixing step comprises from about 40% to about 90% by weight of the composite material. The at least one polyol, the at least one isocyanate, the polyurethane component, or the composite material can have the properties discussed above.

DETAILED DESCRIPTION

Figure 1:
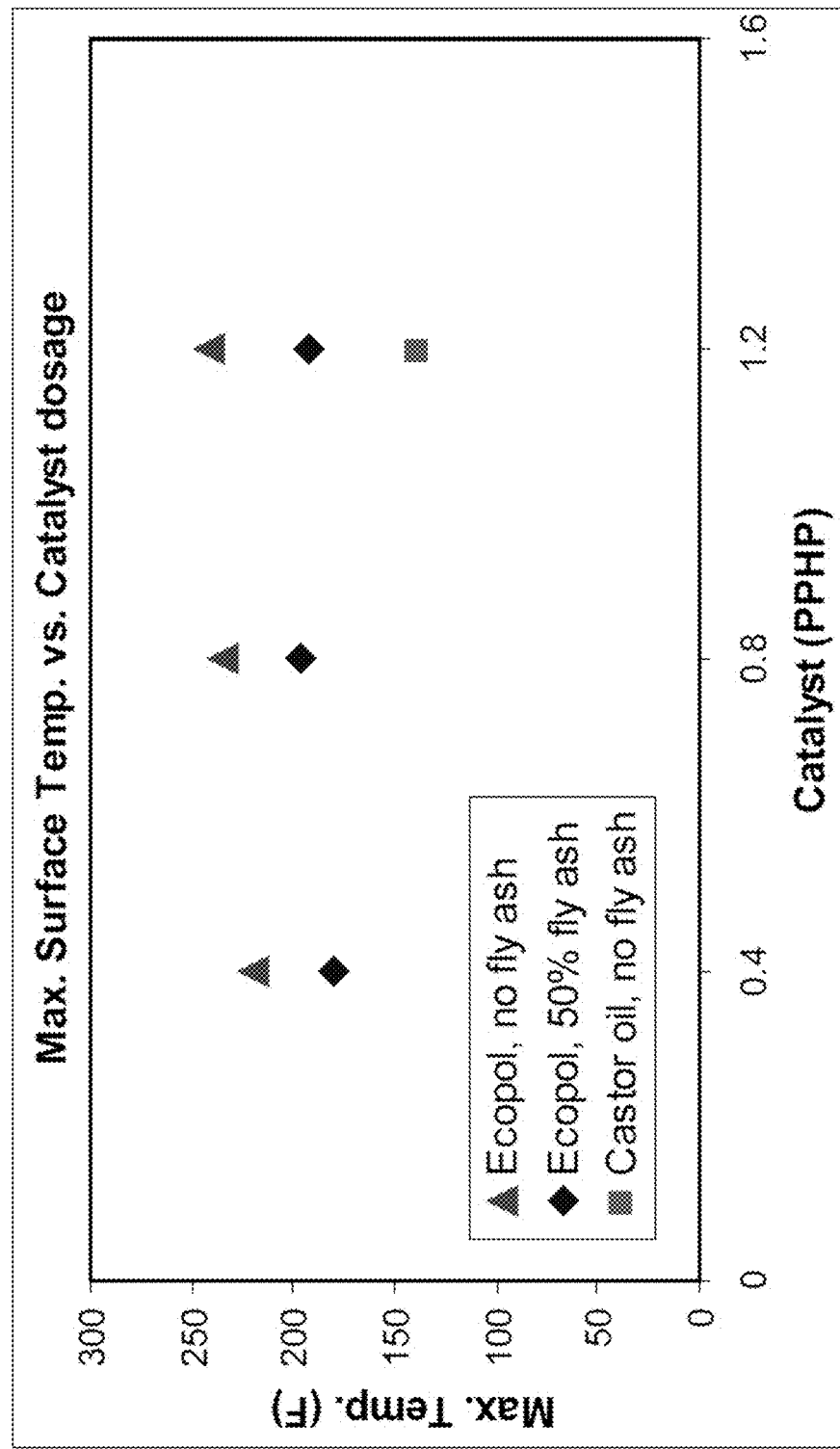
FIG. 1 is a graph illustrating the maximum surface temperatures from producing polyurethanes using highly reactive polyols and castor oil at different catalyst dosages and with and without added fly ash filler.

Composite materials and methods for their preparation are described herein. The composite materials include a polyurethane formed by the reaction of at least one isocyanate, selected from the group consisting of diisocyanates, polyisocyanates, and mixtures thereof, and at least one polyol, in the presence of coal ash and at least one catalyst. The composite materials are formed using in highly reactive systems that can include highly reactive polyols, isocyanates, or both. The highly reactive polyurethane systems that do not experience scorching or the other issues associated with highly reactive polyurethane systems.

The composite materials described herein as well as their polyurethane component can be formulated with a high total environmental content. As used herein, the term total environmental content refers to the sum of the total renewable content and the total recyclable content used to form a composite material or its polyurethane component and is expressed as a weight percent. As used herein, renewable content refers to matter that is provided by natural processes or sources. Examples of renewable content include alcohol and oils from plants, such as castor oil and soybean oil. Isocyanates derived from natural oil, such as castor oil pre-polymers and soybean oil pre-polymers, are also examples of renewable content. As used herein, recyclable content includes content that is derived from materials that would otherwise have been discarded. Examples of recyclable content include a recyclable polyol (i.e., one derived from recyclable polyester), glycerin sourced from a biodiesel plant, and coal ash. Renewable content and recyclable content are used in the composites described herein to produce composite materials and polyurethane components with a high total environmental content.

The total environmental content of the polyurethane component (based only on the polyols and isocyanates) of the composite materials described herein can be greater than 35%. Further, the total environmental content of the polyurethane components described herein can be greater than 40% or greater than 45%. Examples of the total environmental content of the polyurethane components include environmental content greater than 36%, greater than 37%, greater than 38%, greater than 39%, greater than 41%, greater than 42%, greater than 43%, and greater than 44%. Additionally, the total environmental content of the polyurethane components can be about 36%, about 37%, about 38%, about 39%, about 40%, about 41%, about 42%, about 43%, about 44%, about 45%, about 46%, about 47%, about 48%, about 49%, or about 50%. As used herein, the term about is intended to capture the range of experimental error (e.g., ±1%) associated with making the specified measurement. Unless otherwise noted, all percentages and parts are by weight.

The total environmental content of the composite materials described herein can be greater than 75%. Further, the total environmental content of the composite materials described herein can be greater than 80% or greater than 85%. Examples of the total environmental content of the composite materials include total environmental content greater than 76%, greater than 77%, greater than 78%, greater than 79%, greater than 81%, greater than 82%, greater than 83%, and greater than 84%. Additionally, the total environmental content of the composite materials can be about 75%, about 76%, about 77%, about 78%, about 79%, about 80%, about 81%, about 82%, about 83%, about 84%, about 85%, about 86%, about 87%, about 88%, about 89%, or about 90%.

The at least one polyol for use with the composite materials described herein can include polyester or polyether polyols. In some embodiments, the at least one polyol can include 50% or more of one or more highly reactive polyols. For example, the at least one polyol can include greater than about 55%, greater than about 60%, greater than about 65%, greater than about 70%, greater than about 75%, greater than about 80%, greater than about 85%, greater than about 90%, greater than about 95%, or about 100% of one or more highly reactive polyols.

In some embodiments, the one or more highly reactive polyols have a primary hydroxyl number of greater than about 250. As used herein, the primary hydroxyl number is defined as the hydroxyl number multiplied by the percentage of primary hydroxyl groups based on the total number of hydroxyl groups in the polyol. For example, the primary hydroxyl group number can be greater than about 255, greater than about 260, greater than about 265, greater than about 270, greater than about 275, greater than about 280, greater than about 285, greater than about 290, or greater than about 295. In some examples, the highly reactive polyol has a hydroxyl number of greater than about 300, greater than about 305, greater than about 310, greater than about 315, greater than about 320, greater than about 325, greater than about 330, greater than about 335, greater than about 340, greater than about 345, or greater than about 350.

In some embodiments, the one or more highly reactive polyols include a large number of primary hydroxyl groups (e.g. about 75% or more) based on the total number of hydroxyl groups in the polyol. For example, the highly reactive polyols can include about 80% or more, about 85% or more, about 90% or more, about 95% or more, or about 100% of primary hydroxyl groups. The number of primary hydroxyl groups can be determined using fluorine NMR spectroscopy as described in ASTM D4273 [34], which is hereby incorporated by reference in its entirety.

In some embodiments, the highly reactive polyols each produce a Brookfield viscosity rise to a Brookfield viscosity of over 50,000 mPa·s in less than about 225 seconds when used to replace the polyols used in the standard polyurethane formulation of the Brookfield Viscosity Test (i.e. Multranol 4035 and Arcol LHT-240). The Brookfield Viscosity Test is described, for example, in *Polyurethane Handbook: Chemistry, Raw Materials, Processing Application, Properties*, $2^{nd}$ Edition, Ed: Gunter Oertel; Hanser/Gardner Publications, Inc., Cincinnati, Ohio; *Rigid Plastic Foams*, T. H. Ferrigno (1963); and *Reaction Polymers: Polyurethanes, Epoxies, Unsaturated Polyesters, Phenolics, Special Monomers and Additives: Chemistry, Technology, Applications*, Wilson F. Gum et al. (1992), which are all herein incorporated by reference. In further embodiments, the highly reactive polyols each produce a Brookfield viscosity rise in the Brookfield Viscosity Test to a viscosity of over 50,000 mPa·s in less than about 220 seconds, less than about 210 seconds, less than about 200 seconds, less than about 190 seconds, less than about 180 seconds, less than about 170 seconds, less than about 160 seconds, or even less than about 150 seconds.

Exemplary highly reactive polyols include Pel-Soy 744 and Pel-Soy P-750, soybean oil based polyols commercially available from Pelron Corporation; Agrol Diamond, a soybean oil based polyol commercially available from BioBased Technologies; Ecopol 122, Ecopol 131 and Ecopol 132, soybean oil polyols formed using polyethylene terephthalate and commercially available from Ecopur Industries; Stepanpol PD-110 LV and PS 2352, polyols based on soybean oil, diethylene glycol and phthallic anhydride and commercially available from Stepan Company; Voranol 280, 360 and WR2000, polyether polyols commercially available from Dow Chemical Company; Honey Bee HB-530, a soybean oil-based polyol commercially available from MCPU Polymer Engineering; Renewpol, commercially available from Styrotech Industries (Brooklyn Park, Minn.); JeffAdd B 650, a 65% bio-based content (using ASTM D6866-06) additive based on soybean oil commercially available from Huntsman Polyurethanes; Jeffol SG 360, a sucrose and glycerin-based polyol commercially available from Huntsman Polyurethanes; and derivatives thereof. For example, Ecopol 131 is a highly reactive aromatic polyester polyol comprising 80% primary hydroxyl groups, a hydroxyl number of 360-380 mg KOH/g, i.e., a primary hydroxyl number of 288-304 mg KOH/g, and a viscosity rise when used to replace the polyols used in the standard polyurethane formulation of the Brookfield Viscosity Test of over 50,000 mPa·s in less than about 150 seconds. In some embodiments, the highly reactive plant-based polyols can be formed by the reaction of a soybean oil and a polyester to produce a plant-based polyester polyol. For example, the soybean oil-based polyol can be formed by the reaction of a soybean oil and a recycled polyester. In some embodiments, the high hydroxyl number polyol can include renewable and recyclable content.

The at least one polyol for use with the composite materials described herein can include one or more plant-based polyols or non plant-based polyols. The one or more plant-based polyols useful with the composite materials described herein can include polyols containing ester groups that are derived from plant-based fats and oils. Accordingly, the one or more plant-based polyols can contain structural elements of fatty acids and fatty alcohols. Starting materials for the plant-based polyols of the polyurethane component can include fats and/or oils of plant-based origin with preferably unsaturated fatty acid residues. The one or more plant-based polyols useful with the composite materials described herein include, for example, castor oil, coconut oil, corn oil, cottonseed oil, lesquerella oil, linseed oil, olive oil, palm oil, palm kernel oil, peanut oil, sunflower oil, tall oil, and mixtures thereof. In some embodiments, the at least one polyol can include castor oil. Castor oil is a well-known, commercially available material, and is described, for example, in Encyclopedia of Chemical Technology, Volume 5, John Wiley & Sons (1979). Suitable castor oils include those sold by Vertellus Specialties, Inc., e.g., DB® Oil, and Eagle Specialty Products, e.g., T31® Oil. In some embodiments, the one or more plant-based polyols can be derived from soybean oil as the plant-based oil. For example, the plant-based polyols can be highly reactive polyols derived from soybean oil as described above.

The at least one polyol can include 50% or less of one or more less reactive polyols in addition to the one or more highly reactive polyols. For example, the at least one polyol can include less than about 45%, less than about 40%, less than about 35%, less than about 30%, less than about 25%, less than about 20%, less than about 15%, less than about 10%, or less than about 5%, of one or more less reactive polyols.

Less reactive polyols can have lower numbers of primary hydroxyl groups, lower primary hydroxyl numbers, and higher times to reach 50,000 mPa·s using the Brookfield Viscosity Test, than the highly reactive polyols. In some embodiments, the less reactive polyols have about 50% or less primary hydroxyl groups, about 40% or less primary hydroxyl groups, about 30% or less primary hydroxyl groups, about 20% or less primary hydroxyl groups, or even about 10% or less primary hydroxyl groups. The less reactive polyols can have primary hydroxyl numbers of less than about 220, less than about 200, less than about 180, less than about 160, less than about 140, less than about 120, less than about 100, less than about 80, less than about 60, less than about 40, or even less than about 20. Less reactive polyols can also have Brookfield viscosity rise to over 50,000 mPa·s when used to replace the polyols in the standard polyurethane formulation of the Brookfield Viscosity Test of greater than about 300 seconds, greater than about 350 seconds, greater than about 400 seconds, greater than about 450 seconds, greater than about 500 seconds, greater than about 550 seconds, or even greater than about 600 seconds. Suitable less reactive polyols include castor oil; Stepanpol PS-2052A (commercially available from the Stepan Company); Agrol 2.0, 3.6, 4.3, 5.6 and 7.0 (plant-based polyols commercially available from BioBased Technologies); Ecopol 123 and Ecopol 124, which are commercially available from Ecopur Industries; Honey Bee HB-150 and HB-230, soybean oil-based polyols commercially available from MCPU Polymer Engineering; Terol 1154, commercially available from Oxid (Houston, Tex.); Multranol 3900, Multranol 3901, Arcol 11-34, Arcol 24-32, Arcol 31-28, Arcol E-351, Arcol LHT-42, and Arcol LHT-112, commercially available from Bayer; and Voranol 220-028, 220-094, 220-110N, 222-056, 232-027, 232-034, and 232-035, commercially available from Dow.

The at least one polyol for use in the invention can have an average functionality of about 1.5 to about 8.0, about 1.6 to about 6.0, about 1.8 to about 4.0, about 2.5 to about 3.5, or about 2.6 to about 3.1. The average hydroxyl number values (as measured in units of mg KOH/g) for the at least one polyol can be from about 100 to about 600, about 150 to about 550, about 200 to about 500, about 250 to about 440, about 300 to about 415, and about 340 to about 400.

The composite materials can include more than one type of polyol. The one or more polyols can be combined in various percentages, e.g., 15-40% of a less reactive polyol and 60-85% of a highly reactive polyol.

Isocyanates useful with the composite materials described herein include one or more monomeric or oligomeric poly- or di-isocyanates. The monomeric or oligomeric poly- or di-isocyanate include aromatic diisocyanates and polyisocyanates. The isocyanates can also be blocked isocyanates, or pre-polymer isocyanates (e.g., castor oil pre-polymer isocyanates and soy polyol pre-polymer isocyanates). An example of a useful diisocyanate is methylene diphenyl diisocyanate (MDI). Useful MDI's include MDI monomers, MDI oligomers, and mixtures thereof.

Further examples of useful isocyanates include those having NCO (i.e., the reactive group of an isocyanate) contents ranging from about 25% to about 35% by weight. Examples of useful isocyanates are found, for example, in *Polyurethane Handbook: Chemistry, Raw Materials, Processing Application, Properties,* $2^{nd}$ Edition, Ed: Gunter Oertel; Hanser/Gardner Publications, Inc., Cincinnati, Ohio, which is herein incorporated by reference. Suitable examples of aromatic polyisocyanates include 2,4- or 2,6-toluene diisocyanate, including mixtures thereof p-phenylene diisocyanate; tetramethylene and hexamethylene diisocyanates; 4,4-dicyclohexylmethane diisocyanate; isophorone diisocyanate; 4,4-phenylmethane diisocyanate; polymethylene polyphenylisocyanate; and mixtures thereof.

In addition, triisocyanates may be used, for example, 4,4,4-triphenylmethane triisocyanate; 1,2,4-benzene triisocyanate; polymethylene polyphenyl polyisocyanate; methylene polyphenyl polyisocyanate; and mixtures thereof. Suitable blocked isocyanates are formed by the treatment of the isocyanates described herein with a blocking agent (e.g., diethyl malonate, 3,5-dimethylpyrazole, methylethylketoxime, and caprolactam). Isocyanates are commercially available, for example, from Bayer Corporation (Pittsburgh, Pa.) under the trademarks MONDUR and DESMODUR. Other examples of suitable isocyanates include MONDUR MR Light (Bayer Corporation; Pittsburgh, Pa.), PAPI 27 (Dow Chemical Company; Midland, Mich.), Lupranate M20 (BASF Corporation; Florham Park, N.J.), Lupranate M70L (BASF Corporation; Florham Park, N.J.), Rubinate M (Huntsman Polyurethanes; Geismar, La.), Econate 31 (Ecopur Industries), and derivatives thereof.

In some embodiments, the at least one isocyanates can include 50% or more of one or more highly reactive isocyanates. Suitable highly reactive isocyanates when replacing the isocyanate used in the standard polyurethane formulation of the Brookfield Viscosity Test (i.e. Mondur MR Light) can produce a Brookfield viscosity of over 50,000 mPa·s in less than 400 seconds, less than 380 seconds, less than 360 seconds, less than 340 seconds, less than 320 seconds, or even less than 300 seconds. An exemplary highly reactive isocyanate includes Econate 31, an isocyanate commercially available from Ecopur Industries.

The average functionality of isocyanates useful with the composites described herein is between about 1.5 to about 5. Further, examples of useful isocyanates include isocyanates with an average functionality of about 2 to about 4.5, about 2.2 to about 4, about 2.4 to about 3.7, about 2.6 to about 3.4, and about 2.8 to about 3.2.

As indicated above, in the composite materials described herein, an isocyanate is reacted with a polyol to produce the polyurethane formulation. In general, the ratio of isocyanate groups to the total isocyanate reactive groups, such as hydroxyl groups, water and amine groups, is in the range of about 0.5:1 to about 1.5:1, which when multiplied by 100 produces an isocyanate index between 50 and 150. Additionally, the isocyanate index can be from about 80 to about 120, from about 90 to about 120, from about 100 to about 115, or from about 105 to about 110. As used herein, an isocyanate may be selected to provide a reduced isocyanate index, which can be reduced without compromising the chemical or mechanical properties of the composite material.

As described above, the composite materials described herein include a polyurethane formed by the reaction of at least one isocyanate and at least one polyol in the presence of coal ash. The coal ash can by fly ash, bottom ash, or combinations thereof. In some examples, the coal ash used is fly ash. Fly ash is produced from the combustion of pulverized coal in electrical power generating plants. The fly ash useful with the composite materials described herein can be Class C fly ash, Class F fly ash, or a mixture thereof. Fly ash produced by coal-fueled power plants is suitable for incorporation in the composites described herein.

Fly ash is present in the composites described herein in amounts from about 40% to about 90% by weight. Further, fly ash can be present in amounts from about 60% to about 85% by weight. Examples of the amount of fly ash present in the composites described herein include about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, or about 90%.

One or more additional fillers can be used in the composite materials described herein. Examples of fillers useful with the composite materials include other types of ash such as those produced by firing fuels including industrial gases, petroleum coke, petroleum products, municipal solid waste, paper sludge, wood, sawdust, refuse derived fuels, switchgrass or other biomass material. The one of more additional fillers can also include ground/recycled glass (e.g., window or bottle glass); milled glass; glass spheres; glass flakes; activated carbon; calcium carbonate; aluminum trihydrate (ATH); silica; sand; ground sand; silica fume; slate dust; crusher fines; red mud; amorphous carbon (e.g., carbon black); clays (e.g., kaolin); mica; talc; wollastonite; alumina; feldspar; bentonite; quartz; garnet; saponite; beidellite; granite; calcium oxide; calcium hydroxide; antimony trioxide; barium sulfate; magnesium oxide; titanium dioxide; zinc carbonate; zinc oxide; nepheline syenite; perlite; diatomite; pyrophillite; flue gas desulfurization (FGD) material; soda ash; trona; inorganic fibers; soy meal; pulverized foam; and mixtures thereof.

In some embodiments, inorganic fibers or organic fibers can be included in the polymer composite, e.g., to provide increased strength, stiffness or toughness. Fibers suitable for use with the composite materials described herein can be provided in the form of individual fibers, fabrics, rovings, or tows. These can be added prior to polymerization and can be chopped before or during the mixing process to provide desired fiber lengths. Alternately, the fibers can be added after polymerization, for example, after the composite material exits the mixing apparatus. The fibers can be up to about 2 in. in length. The fibers can be provided in a random orientation or can be axially oriented. The fibers can be coated with a sizing to modify performance to make the fibers reactive. Exemplary fibers include glass, polyvinyl alcohol (PVA), carbon, basalt, wollastonite, and natural (e.g., bamboo or coconut) fibers.

The inclusion of fillers in the composite materials as described herein can modify and/or improve the chemical and mechanical properties of the composite materials. For example, the optimization of various properties of the composite materials allows their use in building materials and other structural applications. High filler loading levels can be used in composite materials without a substantial reduction of (and potentially an improvement in) the intrinsic structural, physical, and mechanical properties of a composite.

The inclusion of high levels of coal ash fillers such as fly ash has also surprisingly enabled the use of high levels of highly reactive polyols, highly reactive isocyanates, and/or catalysts. Specifically, highly reactive polyols generally contain mostly primary hydroxyl groups, which are significantly more reactive than secondary and tertiary hydroxyl groups. Due to the high reactivity, a large amount of heat can potentially be generated in a short time under certain conditions, thereby creating a significant exothermic release during polyurethane formation and scorching the resultant polyurethane. Furthermore, in the absence of a heat dissipater, the high heat could result in processing difficulties and safety concerns and a loss of the composite's physical properties. Thus, these types of polyols have been undesirable for use in polyurethanes. Applicants have discovered unexpectedly that high filler levels of coal ash such as fly ash allow the use of highly reactive polyols in polyurethanes and even at high levels because the coal ash acts as a heat sink to absorb a sufficient amount of the exothermic release during polyurethane formation to prevent scorching. The use of the highly reactive polyols also allow for larger amounts of fly ash to be used because the reaction occurs quickly as shown by the tack free times (i.e., the time interval between mixing the ingredients and the time when the surface of the foam does not adhere to an object such as a wooden tongue depressor) for polyurethane systems using these types of polyols. Furthermore, some of the highly reactive polyols (e.g. Ecopol 131) are inexpensive relative to other polyols used and thus more desirable.

The use of filled composites as building materials has advantages over composite materials made using lower filler levels or no filler. For example, the use of higher filler loading levels in building materials may allow the building materials to be produced at a substantially decreased cost.

One or more catalysts are added to facilitate curing and can be used to control the curing time of the polymer matrix. Examples of useful catalysts include amine-containing catalysts (such as DABCO and tetramethylbutanediamine) and tin-, mercury-, and bismuth-containing catalysts. In some embodiments, 0.01 wt % to 2 wt % catalyst or catalyst system (e.g., 0.025 wt % to 1 wt %, 0.05 wt % to 0.5 wt %, or 0.1 wt % to about 0.25 wt %) can be used.

Additional components useful with the composite materials described herein include foaming agents, blowing agents, surfactants, chain-extenders, crosslinkers, coupling agents, UV stabilizers, fire retardants, antimicrobials, antioxidants, and pigments. Though the use of such components is well known to those of skill in the art, some of these additional additives are further described herein.

Foaming agents and blowing agents may be added to the composite materials described herein to produce a foamed version of the composite materials. Examples of blowing agents include organic blowing agents, such as halogenated hydrocarbons, acetone, hexanes, and other materials that have a boiling point below the reaction temperature. Chemical foaming agents include azodicarbonamides (e.g., Celogen manufactured by Lion Copolymer Geismar); and other materials that react at the reaction temperature to form gases such as carbon dioxide. Water is an exemplary foaming agent that reacts with isocyanate to yield carbon dioxide. The presence of water as an added component or in the filler also can result in the formation of polyurea bonds through the reaction of the water and isocyanate.

The addition of excess foaming or blowing agents above what is needed to complete the foaming reaction can add strength and stiffness to the composite material, improve the water resistance of the composite material, and increase the thickness and durability of the outer skin of the composite material. Such excessive blowing agent may produce a vigorously foaming reaction product. To contain the reaction product, a forming device that contains the pressure or restrains the materials from expanding beyond the design limits may be used, such as a stationary or continuous mold.

Surfactants can be used as wetting agents and to assist in mixing and dispersing the inorganic particulate material in a composite. Surfactants can also stabilize and control the size of bubbles formed during the foaming event and the resultant cell structure. Surfactants can be used, for example, in amounts below about 0.5 wt % based on the total weight of the mixture. Examples of surfactants useful with the polyurethanes described herein include anionic, non-ionic and cationic surfactants. For example, silicone surfactants such as DC-197 and DC-193 (Air Products; Allentown, Pa.) can be used.

Low molecular weight reactants such as chain-extenders and/or crosslinkers can be included in the composite materials described herein. These reactants help the polyurethane system to distribute and contain the inorganic filler and/or fibers within the composite material. Chain-extenders are difunctional molecules, such as diols or diamines, that can polymerize to lengthen the urethane polymer chains. Examples of chain-extenders include ethylene glycol; 1,4-butanediol; ethylene diamine, 4,4'-methylenebis(2-chloroaniline) (MBOCA); diethyltoluene diamine (DETDA); and aromatic diamines such as Unilink 4200 (commercially available from UOP). Crosslinkers are tri- or greater functional molecules that can integrate into a polymer chain through two functionalities and provide one or more further functionalities (i.e., linkage sites) to crosslink to additional polymer chains. Examples of crosslinkers include glycerin, trimethylolpropane, sorbitol, diethanolamine, and triethanolamine. In some composites, a crosslinker or chain-extender may be used to replace at least a portion of the at least one polyol in the composite material. For example, the polyurethane can be formed by the reaction of an isocyanate, a polyol, and a crosslinker.

Coupling agents and other surface treatments such as viscosity reducers, flow control agents, or dispersing agents can be added directly to the filler or fiber, or incorporated prior to, during, and/or after the mixing and reaction of the composite material. Coupling agents can allow higher filler loadings of an inorganic filler such as fly ash and may be used in small quantities. For example, the composite material may comprise about 0.01 wt % to about 0.5 wt % of a coupling agent. Examples of coupling agents useful with the composite materials described herein include Ken-React LICA 38 and KEN-React KR 55 (Kenrich Petrochemicals; Bayonne, N.J.). Examples of dispersing agents useful with the composite materials described herein include JEFFSPERSE X3202, JEFFSPERSE X3202RF, and JEFFSPERSE X3204 (Huntsman Polyurethanes; Geismar, La.).

Ultraviolet light stabilizers, such as UV absorbers, can be added to the composite materials described herein. Examples of UV light stabilizers include hindered amine type stabilizers and opaque pigments like carbon black powder. Fire retardants can be included to increase the flame or fire resistance of the composite material. Antimicrobials can be used to limit the growth of mildew and other organisms on the surface of the composite. Antioxidants, such as phenolic antioxidants, can also be added. Antioxidants provide increased UV protection, as well as thermal oxidation protection.

Pigments or dyes can optionally be added to the composite materials described herein. An example of a pigment is iron oxide, which can be added in amounts ranging from about 2 wt % to about 7 wt %, based on the total weight of the composite material.

As discussed herein, the polyurethane system can be a highly reactive system. This can be accomplished through using highly reactive polyols and/or highly reactive isocyanates as discussed herein, or by using increased catalyst, in the presence of coal ash. In some embodiments, the polyurethane when tested in a Brookfield Viscosity Test produces a Brookfield viscosity increase to over 50,000 mPa·s in less than about 225 seconds, less than about 220 seconds, less than about 210 seconds, less than about 200 seconds, less than about 190 seconds, less than about 180 seconds, less than about 170 seconds, less than about 160 seconds, or even less than about 150 seconds.

In some embodiments, the unfilled polyurethane (i.e., only the polyol, isocyanate, catalyst, and other non-filler additives) produces a surface temperature rise in a cup test of at least about 120° F. In other words, when the at least one isocyanate, the at least one polyol, the at least one catalyst, and any non-filler additives are mixed together in the amounts used in the polyurethane without fly ash or other fillers (e.g. fibers), the mixture produces a surface temperature rise in a cup test of at least 120° F. The surface temperature rise can be at least about 125° F., at least about 130° F., at least about 135° F., at least about 140° F., at least about 145° F., or even at least about 150° F.

In some embodiments, it is desirable to maximize cream time of the composite material while limiting the tack free time of the composite material, particularly in the continuous production of building materials. In some embodiments, the composite material has a cream time (the time for the polyurethane blowing reaction to initiate) of at least 5 seconds, at least 10 seconds, at least 15 seconds, at least 20 seconds, at least 25 seconds, or even at least 30 seconds. In some embodiments, the composite material has a wet tack free time as determined under ASTM D7487-08 of less than 90 seconds, less than 85 seconds, less than 80 seconds, less than 75 seconds, less than 70 seconds, less than 65 seconds, or even less than 60 seconds. Thus, the polyurethane composites can be demolded quickly resulting in faster production rates.

A method of preparing a composite material is also described herein. The method includes mixing the at least one isocyanate, the at least one polyol, the coal ash (e.g., fly ash), and the catalyst. The isocyanate and polyol are allowed to react in the presence of the coal ash and catalyst to form the composite material.

The composite material can be produced using a batch, semi-batch, or continuous process. At least a portion of the mixing step, reacting step, or both, can be conducted in a mixing apparatus such as a high speed mixer or an extruder. The method can further include the step of extruding the resulting composite material through a die or nozzle. In some embodiments, a mixing step of the method used to prepare the composite materials described herein includes: (1) mixing the polyol and fly ash; (2) mixing the isocyanate with the polyol and the fly ash; and (3) mixing the catalyst with the isocyanate, the polyol, and the fly ash. In some embodiments, a mixing step of the method used to prepare the composite materials described herein includes mixing the liquid ingredients (i.e., the polyol, isocyanate, catalyst, surfactants, and water) and then combining the mixed liquid ingredients with the fly ash and optional fiber. As the composite material exits the die or nozzle, the composite material may be placed in a mold for post-extrusion curing and shaping. For example, the composite material can be allowed to cure in individual molds or it can be allowed to cure in a continuous forming system such as a belt molding system.

An ultrasonic device can be used for enhanced mixing and/or wetting of the various components of the composite materials described herein. Such enhanced mixing and/or wetting can allow a high concentration of filler to be mixed with the polyurethane matrix. The ultrasonic device produces an ultrasound of a certain frequency that can be varied during the mixing and/or extrusion process. The ultrasonic device useful in the preparation of composite materials described herein can be attached to or adjacent to an extruder and/or mixer. For example, the ultrasonic device can be attached to a die or nozzle or to the port of an extruder or mixer. An ultrasonic device may provide de-aeration of undesired gas bubbles and better mixing for the other components, such as blowing agents, surfactants, and catalysts.

The composite materials described herein can be foamed. The polyol and the isocyanate can be allowed to produce a foamed composite material after mixing the components according to the methods described herein. The composite materials described herein can be formed while they are actively foaming or after they have foamed. For example, the material can be placed under the pressure of a mold cavity prior to or during the foaming of the composite material. When a foaming composite material is molded by a belt molding system into a product shape, the pressure that the foamed part exerts on the belts impacts the resulting mechanical properties. For example, as the pressure of the foaming increases and if the belt system can hold this pressure without the belts separating, then the product may have higher flexural strength than if the belts allowed leaking or pressure drop.

The composite materials described herein can be formed into shaped articles and used in various applications including building materials. Examples of such building materials include siding material, roof coatings, roof tiles, roofing material, carpet backing, flexible or rigid foams such as automotive foams (e.g., for dashboard, seats or roofing), component coating, and other shaped articles. Examples of shaped articles made using composite materials described herein include roofing material such as roof tile shingles; siding material; trim boards; carpet backing; synthetic lumber; building panels; scaffolding; cast molded products; decking materials; fencing materials; marine lumber; doors; door parts; moldings; sills; stone; masonry; brick products; posts; signs; guard rails; retaining walls; park benches; tables; slats; and railroad ties. The composite materials described herein further can be used as reinforcement of composite structural members including building materials such as doors; windows; furniture; and cabinets and for well and concrete repair. The composite materials described herein also can be used to fill gaps, particularly to increase the strength of solid surface articles and/or structural components. The composite materials can be flexible, semi-rigid or rigid foams. In some embodiments, the flexible foam is reversibly deformable (i.e. resilient) and can include open cells. A 8"×1"×1" piece of a flexible foam can generally wrap around a 1" diameter mandrel at room temperature without rupture or fracture. Flexible foams also generally have a density of less than 5 lb/ft$^3$ (e.g. 1 to 5 lb/ft$^3$). In some embodiments, the rigid foam is irreversibly deformable and can be highly crosslinked and/or can include closed cells. Rigid foams generally have a density of 5 lb/ft$^3$ or greater (e.g. 5 to 60 lb/ft$^3$, 20 to 55 lb/ft$^3$, or 30 to 50 lb/ft$^3$).

As discussed above, the reactivity of the polyurethane system can be measured using the Brookfield Viscosity Test (BVT). The Brookfield Viscosity Test determines the reactivity of a polyurethane system by determining how quickly viscosity increases showing gellation of the polyurethane system. The BVT can be conducted using a standard polyurethane formulation and by replacing components in the standard polyurethane formulation (e.g. the polyols or the isocyanate) to determine the viscosity rise. Alternately, the BVT can be conducted using the actual polyurethane formulation including the components in the amounts that would be used in the actual polyurethane formulation.

The standard polyurethane formulation for use in the BVT includes the following components:

| Component | Amount (parts by wt) | Equiv Wt. | Equivalents |
|---|---|---|---|
| ARCOL LHT-240 polyol | 50.0 | 224.3 | 0.223 |
| MULTRANOL 4035 polyol | 50.0 | 148.0 | 0.338 |
| DC-197 surfactant | 1.0 | 0.0 | — |
| DABCO R-8020 catalyst | 2.0 | 110.0 | 0.018 |
| Fly ash | 460.0 | 0.0 | — |
| Water | 0.5 | 9.0 | 0.056 |

For the standard, the above components were mixed in a 600 mL glass jar at 1000 RPM for 30-seconds using any lab-duty electric stirrer equipped with a Jiffy Mixer brand, Model LM, mixing blade. MONDUR MR Light (a polymeric MDI, having a NCO weight of 31.5%, viscosity of 200 mPa·s @ 25° C., equivalent weight of 133, and a functionality of 2.8) was then added at an isocyanate index of 110 and the components mixed for an additional 30 seconds. The glass jar is then removed from the stirrer and placed on a Brookfield viscometer. The viscosity rise is measured using a viscometer for 20 minutes or until 50,000 mPa·s is reached. For the standard, a viscosity of 50,000 mPa·s is reached in about 550 seconds.

To test the reactivity of other components such as polyols, isocyanates and catalysts, these components replace the corresponding components used in the BVT standard polyurethane formulation. For example, to test the reactivity of a polyol, the polyol is added in an amount of 100 parts by weight and replaces the ARCOL LHT-240 and MULTRANOL 4035 polyols used in the standard polyurethane formulation. To test the reactivity of an isocyanate, the isocyanate replaces MONDUR MR Light and is added at a viscosity index of 110. A catalyst to be tested can be added in an amount of 2.0 parts by weight and replaces the DABCO R-8020 catalyst used in the standard polyurethane formulation.

To test the reactivity of an entire polyurethane system, all the standard components are replaced by those used in the polyurethane system of interest and used in the amounts they would be used in the polyurethane system of interest.

The cup test as described herein is similar to the test procedure provided in ASTM D7487-08 (2008) and the general definitions, terms, safety precautions, and preparations used herein are the same as those used in ASTM D7487-08 (2008). The procedure is as follows:

1. Set the stirrer (Ryobi brand, Model DP-101) to run at 2000 rpm. The stirrer is equipped with a 2-inch diameter stirring blade, a GraLab Model 555 Electronic Timer, and an auto-reset and foot-switch controller.

2. Set the experiment formulation sheet and record sheet.

3. Wet-tare a 100 ml tri-pour beaker. Referring to the formulation sheet, add isocyanate into the beaker.

4. Weigh a 1000 ml plastic mixing cup and record the cup weight. Add the required amount of fly ash into the mixing cup (if it is being used). Then, add the required weights of all the other resin ingredients (except isocyanate) into the same mixing cup precisely. Record the weights to the nearest 0.1 gram.

5. Stir the mixture for 1 min (if fly ash is not being used, the stirring time is reduced to 15 seconds). Record the mixture temperature after stirring.

6. Add the required amount of isocyanate from the beaker (pre-weighed isocyanate in Step 3) into the mixing cup quickly (less than 30 secs) precisely. Record the weight to the nearest 0.1 gram.

7. Immerse the stirrer blade into the mixture. Simultaneously, turn on the mixer switch and start the stop-watch. Mix everything inside the cup for 15 seconds. At the end of the 15 seconds, remove the cup from the spinning mixing blade and record the mixture temperature after stirring.

8. Place the cup in a fume hood and observe. Record the characteristic parameters such as cream time, gel time, top of cup (TOC) time, tack free time, end of rise time, and maximum surface temperature. Maximum surface temperature can be measured using an infrared (IR) thermometer.

9. Clean the stirring blade thoroughly after each test using a container of acetone.

Examples of compositions illustrating aspects of the composites as described herein and demonstrating the use of a highly reactive polyol are provided in Tables 1-2. These composite examples also illustrate the use of environmental content as described herein.

The examples below are intended to further illustrate certain aspects of the methods and compounds described herein, and are not intended to limit the scope of the claims. All parts and percentages are provided on a per weight basis, unless indicated otherwise.

EXAMPLE 1

Exemplary ingredients for a fly ash filled composite material (Composite 1) are shown in Table 1. Composite 1 includes Ecopol 131, a highly reactive polyol which is understood to include 40% soybean oil (renewable content) and 40% recycled polyester (recyclable content). In Composite 1, the fly ash filler contains recyclable content, and castor oil has renewable content. In this example, surfactants, catalysts, water, and glass fibers are not generally considered to have renewable or recyclable content. The use of castor oil as the polyol provides a polyurethane component of the composite with a total environmental content of 38.97 wt %, and the total environmental content for Composite 2 is 79.19%.

TABLE 1

| | Composite 1 | | | |
|---|---|---|---|---|
| Ingredient | Units | Renewable Content, % | Renewable Content Units | Recyclable Units |
| Fly ash | 639.54 | 0 | — | 639.54 |
| Castor Oil | 20.00 | 100 | 20.00 | — |
| Ecopol 131 | 80.00 | 40 | 32.00 | 32.00 |
| Surfactant | 1.00 | 0 | — | — |
| Catalyst | 1.00 | 0 | — | — |
| Water | 1.70 | 0 | — | — |
| Fiber | 54.82 | 0 | — | — |
| Isocyanate | 115.55 | 0 | — | — |
| Delayed catalyst | 0.02 | 0 | — | — |
| Total Units | 913.63 | | | |
| Total Renewable Content Units | — | — | 52.00 | — |
| Total Recyclable Units | — | — | — | 671.54 |
| % Fly Ash | 70.00 | | | |
| % Renewable-Content | 5.69 | | | |
| % Recyclable Content | 73.50 | | | |
| Total Environmental Content | 79.19 | | | |

EXAMPLE 2

Exemplary ingredients for a second fly ash filled composite material (Composite 2) are shown in Table 2. In Composite 2, the fly ash filler and glycerin contain recyclable content, and castor oil contains renewable content. The surfactants, catalysts, water, and glass fibers are not considered to have renewable or recyclable content. The use of castor oil as the polyol provides a polyurethane component of the composite with a total environmental content of 37.45 wt %, and the total environmental content for Composite 3 is 78.83%.

TABLE 2

Composite 2

| Ingredient | Units | Renewable Content, % | Renewable Units | Recyclable Units |
|---|---|---|---|---|
| Fly ash | 665.03 | 0 | — | 665.03 |
| Castor Oil | 18.00 | 100 | 18.00 | — |
| Ecopol 131 | 80.00 | 40 | 32.00 | 32.00 |
| Glycerin | 2.00 | 0 | — | 2.00 |
| Surfactant | 1.00 | 0 | — | — |
| Catalyst | 1.00 | 0 | — | — |
| Water | 1.70 | 0 | — | — |
| Fiber | 57.00 | 0 | — | — |
| Isocyanate | 124.29 | 0 | — | — |
| Delayed catalyst | 0.02 | 0 | — | — |
| Total Units | 950.04 | | | |
| Total Renewable Units | — | — | 50.00 | — |
| Total Recyclable Units | — | — | — | 699.03 |
| % Fly Ash | 70.00 | | | |
| % Renewable Content | 5.26 | | | |
| % Recyclable Content | 73.57 | | | |
| Total Environmental Content | 78.83 | | | |

Composites 1-2 used as examples above are based upon a filler loading of about 70 wt % fly ash. However, filler loading can be increased to about 85 wt % fly ash or greater, which would increase the total environmental content (other component amounts being held constant).

EXAMPLE 3

Use of Fly Ash Filler in Highly Reactive Polyurethanes

Polyurethanes were prepared as shown in Table 3, in the presence and absence of fly ash.

TABLE 3

Example Formulation for Polyurethane Foams

| Ingredients | Polyols (100 g) | (%) | Experimental (g) |
|---|---|---|---|
| Filler: Fly Ash | 210.32 | 50.00 | 250.00 |
| Polyol: ECOPOL 131 100% | 100.00 | 23.77 | 118.86 |
| Surfactant: DC-197 from Air Products | 1.00 | 0.24 | 1.19 |
| H$_2$O | 0.60 | 0.14 | 0.71 |
| Catalyst: DABCO 33-LV from Air Products | 0.80 | 0.19 | 0.95 |
| Isocyanate: PAPI 27 from Dow Plastics, Index 110 | 107.92 | 25.66 | 128.28 |

The fly ash was added to a test cup (for the examples in which fly ash is included), and the ingredients were mixed and stirred for 60 seconds. The maximum foam surface temperature, the wet tack free time, and the dry tack free time were determined for each of the formulations, as shown in Table 4. Cups 1-3 include the Ecopol-based polyurethanes in the absence of fly ash at varying catalyst loadings (0.4, 0.8, and 1.2 pphp). As used herein, pphp refers to parts (by weight) per hundred parts of total polyol and pphr refers to parts (by weight) per hundred parts of resin (all components except filler). Cups 4-6 include the Ecopol-based polyurethanes in the presence of fly ash at varying catalyst loadings (0.4, 0.8, and 1.2 pphp). Cup 7 includes a castor-oil based polyurethane in the absence of fly ash at a catalyst loading of 1.2 pphp.

TABLE 4

Test Results for Fly Ash Filled/Unfilled Polyurethane Foams

| Cup # | Catalyst dosage (pphp) | Catalyst dosage (pphr) | Catalyst dosage (wt-%) | H$_2$O (pphp) | H$_2$O (wt-%) | Mixture temp. before adding isocyanate (° F.) | Maximum foam surface temperature (° F.) | Wet tack free time (sec) | Dry tack free time (sec) |
|---|---|---|---|---|---|---|---|---|---|
| 1 | 0.4 | 0.19 | 0.19 | 0.6 | 0.29 | 83 | 220 | 100 | |
| 2 | 0.8 | 0.38 | 0.38 | 0.6 | 0.29 | 85 | 234 | 40 | 55 |
| 3 | 1.2 | 0.57 | 0.57 | 0.6 | 0.28 | 81 | 242 | <20 | 25 |
| 4 | 0.4 | 0.19 | 0.10 | 0.6 | 0.14 | 93 | 180 | 105 | |
| 5 | 0.8 | 0.38 | 0.19 | 0.6 | 0.14 | 93 | 196 | 45 | 80 |
| 6 | 1.2 | 0.57 | 0.28 | 0.6 | 0.14 | 93 | 192 | <40 | 40 |
| 7 | 1.2 | 0.76 | 0.76 | 0.6 | 0.38 | 85 | 139 | 420 | >1000 |

As shown above, the Ecopol-based polyurethanes without fly ash reached surface temperatures of 220-242° F. and it is expected that the internal temperatures were around 300° F. Fly ash was shown to reduce the heat buildup for Ecopol-based polyurethanes as shown by the reduction of the maximum surface temperature. In particular, the maximum surface temperature decreased approximately 40° F. with the addition of 50 wt % fly ash filler (see Table 4). FIG. 1 is a graph illustrating the maximum surface temperatures from producing polyurethanes using Ecopol 131 and polyurethanes using castor oil at different catalyst dosages. The graph shows the significant decrease in the surface temperature for Ecopol 131 based polyurethanes when 50 wt % fly ash filler is added versus not including fly ash. Other coal ashes such as bottom ash perform similarly as fly ash as a heat sink for the polyurethane material.

As shown by the tack free times above, the polyurethane systems using only Ecopol 131 polyol (Cups 1-6) are much more reactive that the polyurethane systems using only castor oil as the polyol. It is believed that this is because the Ecopol 131 contains mostly primary hydroxyl groups and is a highly reactive polyol, whereas castor oil contains mostly secondary hydroxyl groups. Also as a result of the lower reactivity, the maximum surface temperature of castor oil foam is significantly lower than that of Ecopol-based foam at a similar catalyst dosage (see Table 4 and FIG. 1).

Figure 2A:
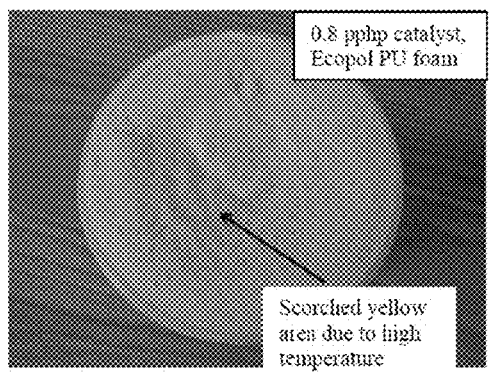
FIGS. 2A and 2B are photos displaying polyurethanes formed from highly reactive polyols without the addition of fly ash and using different catalyst amounts.
Figure 2B:
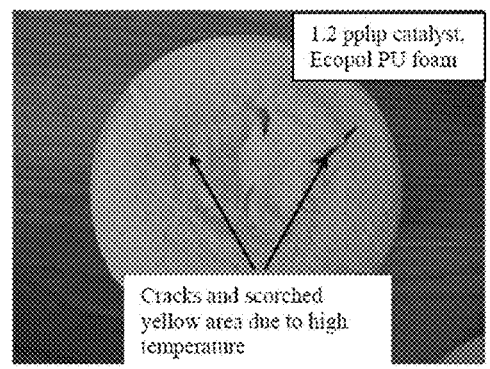
Figure 3A:
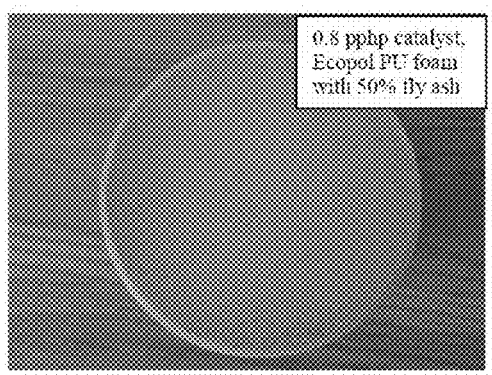
FIGS. 3A and 3B are photos displaying polyurethanes based on highly reactive polyols and fly ash fillers using different catalyst amounts.
Figure 3B:
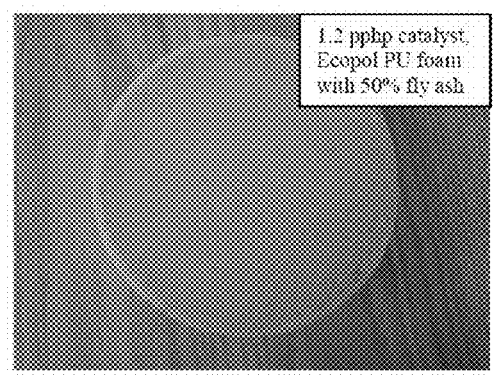

The Ecopol-based polyurethane foams were examined both with and without fly ash. Without fly ash, the large amount of heat buildup displayed in the Ecopol-based polyurethane foams caused cracks and scorching of the Ecopol-based polyurethane foam as evidenced by discoloration and deterioration of the polymer matrix resulting in reduced mechanical properties. This particularly occurs within the internal core of the foam where the temperature can reach very high levels. As shown in FIG. 2A (Ecopol-based polyurethane foam at 0.8 pphp catalyst loading—Cup 2) and FIG. 2B (Ecopol-based polyurethane foam at 1.2 pphp catalyst loading—Cup 3), the foams were scorched at the elevated temperatures (approximately 250-300° F.) that occurred during the polyurethane foam formation. In the presence of fly ash, however, the foam scorching did not occur due to the fly ash heat sink effect. As shown in FIG. 3A (Ecopol-based polyurethane foam with 50% fly ash at 0.8 pphp catalyst loading—Cup 5) and FIG. 3B (Ecopol-based polyurethane foam with 50% fly ash at 1.2 pphp catalyst loading—Cup 6), the foams were not scorched at the temperatures that occurred during polyurethane foam formation. It is noted that, in each case, the polyurethane foams expanded beyond the cups and the portion of the foam beyond the cup was removed with a saw for the fly ash filled samples (Cups 4-6). Overall, fly ash is useful in the processing of polyurethanes based on highly reactive polyols, due to the heat sink mechanism of fly ash.

EXAMPLE 4

Polyol Reactivity Cup Test

Polyurethanes were prepared for each tested polyol as shown in Table 5. In each formulation, fly ash was 55 wt % of the formulation. The polyol was added as 100 parts by weight of the formulation, and isocyanate MONDUR MR-Light from Bayer Corporation (Pittsburgh, Pa.) was added in an amount to maintain an isocyanate index of 110. DC-197, a silicon surfactant from Air Products (Allentown, Pa.), was present in each formulation in an amount of 1 pphp. The amount of water present in each formulation was 0.6 pphp. The catalysts included NIAX Catalyst A33 from Momentive Performance Materials (Albany, N.Y.), present in a dosage of 0.3 pphp in each formulation, and DABCO T-120 from Air Products (Allentown, Pa.), present in a dosage of 0.03 pphp per formulation.

TABLE 5

Example Formulations for Polyurethane Foams for Polyol Reactivity Test

| Cup foam # | Polyols | Polyol Producer | Polyol OH# | Catalyst (pphp) | Catalyst (wt %) | $H_2O$ (pphp) | $H_2O$ (wt %) |
|---|---|---|---|---|---|---|---|
| 8 | Agrol 4.0 | Biobased Technologies | 120 | 0.3 | 0.094 | 0.6 | 0.19 |
| 9 | Agrol 3.0 | Biobased Technologies | 99 | 0.3 | 0.098 | 0.6 | 0.20 |
| 10 | DB Castor oil | Vertellus | 165.98 | 0.3 | 0.087 | 0.6 | 0.17 |
| 11 | Agrol C165 | Biobased Technologies | 160 | 0.3 | 0.088 | 0.6 | 0.18 |
| 12 | Arcol LHT240 | Bayer | 250.45 | 0.3 | 0.076 | 0.6 | 0.15 |
| 13 | Agrol 7.0 | Biobased Technologies | 185 | 0.3 | 0.084 | 0.6 | 0.17 |
| 14 | Voranol 446 | Dow Chemical | 445.24 | 0.3 | 0.059 | 0.6 | 0.12 |
| 15 | Multranol 4035 | Bayer | 379.05 | 0.3 | 0.064 | 0.6 | 0.13 |
| 16 | Agrol 6.0 | Biobased Technologies | 163 | 0.3 | 0.088 | 0.6 | 0.18 |
| 17 | Voranol 360 | Dow Chemical | 359.62 | 0.3 | 0.066 | 0.6 | 0.13 |
| 18 | Voranol 280 | Dow Chemical | 280.5 | 0.3 | 0.073 | 0.6 | 0.15 |
| 19 | Agrol Diamond | Biobased Technologies | 351 | 0.3 | 0.067 | 0.6 | 0.13 |
| 20 | Ecopol 131 | Ecopur | 369.08 | 0.3 | 0.065 | 0.6 | 0.13 |
| 21 | Voranol WR2000 | Dow Chemical | 300 | 0.3 | 0.071 | 0.6 | 0.14 |

Using a procedure that is slightly modified from the cup test procedure described above, the fly ash, polyol, and isocyanate were added to a 1000 ml test cup and the ingredients were mixed and stirred for 60 seconds at 2000 rpm. The surfactant, water, and catalysts were added, and the cup contents were stirred for 15 seconds at 2000 rpm. The cream time, top of cup (TOC) time, wet tack free time, dry tack free time, and surface temperature were determined for each of the formulations, as shown in Table 6.

TABLE 6

Test Results for Polyurethane Reaction Time

| Cup foam # | Temp. after 15 sec mixing everything (° F.) | Max. surface temp. (° F.) | Cream time (sec) | Time to 700 ml (sec) | Time to the top of cup (sec) | Wet tack free time (sec) | Dry tack free time (sec) |
|---|---|---|---|---|---|---|---|
| 8 | 93.0 | — | 40 | 200 | 300 | >1320 | >2400 |
| 9 | 90.8 | — | 38 | 150 | 213 | 900 | 3000 |
| 10 | 90.5 | — | 46 | 150 | 215 | 720 | ~1800 |
| 11 | 86.0 | — | 38 | 108 | 138 | 320 | 720 |
| 12 | 93.9 | 130 | 45 | 117 | 150 | 315 | 630 |
| 13 | 99.1 | — | 34 | 93 | 120 | 280 | 720 |
| 14 |  | — | 70 | 170 | 190 | 280 | 360 |
| 15 | 96.9 | 145 | 41 | 120 | 145 | 265 | 400 |
| 16 | 105.0 | — | 33 | 85 | 115 | 220 | 900 |
| 17 | 104.0 | — | 28 | 50 | 67 | 125 | 235 |
| 18 | 105.0 | — | 33 | 66 | 80 | 120 | 200 |
| 19 | 95.0 | — | 31 | 67 | 75 | 86 | 130 |
| 20 | 107.0 | 180 | 32 | 57 | 64 | 70 | 80 |
| 21 | 94.4 | — | <15 | 22 | 28 | 55 | 80 |

After complete curing of the foams, the foam density and color of the top surface of the foam were measured, as shown in Table 7.

TABLE 7

Test Results for Polyurethane Density and Foam Surface Color and Gloss

| Cup foam # | Cup foam weight (gram) | Cup foam Volume (ml) | Density (pcf) | L | A | B | Gloss |
|---|---|---|---|---|---|---|---|
| 8 | 327.2 | 1000 | 20.4 | 38.9 | 6.45 | 12.97 | Medium - High |
| 9 | 384.0 | 1000 | 24.0 | 39.4 | 6.48 | 13.8 | Medium - High |
| 10 | 330.2 | 885 | 23.3 | 39.11 | 6.51 | 12.52 | Medium - High |
| 11 | 347.7 | 1000 | 21.7 | 42.11 | 6.88 | 15.3 | Low - Medium |
| 12 | 284.3 | 1000 | 17.7 | 43.97 | 11.34 | 15.27 | High |
| 13 | 328.0 | 1000 | 20.5 | 44.53 | 7.07 | 15.84 | High |
| 14 | 324.7 | 1000 | 20.3 | 41.59 | 6.83 | 13.52 | Low |
| 15 | 304.5 | 1000 | 19.0 | 43.7 | 11.36 | 15.2 | High |
| 16 | 329.4 | 1000 | 20.6 | 44.53 | 7.87 | 15.82 | High |
| 17 | 322.6 | 1000 | 20.1 | 49.17 | 7.64 | 17.6 | High |
| 18 | 329.9 | 1000 | 20.6 | 46.05 | 7.33 | 16.65 | Low |
| 19 | 378.8 | 1000 | 23.7 | 47.22 | 7.17 | 16.18 | Medium |
| 20 | 350.0 | 1000 | 21.8 | 50.07 | 12.28 | 17.58 | Medium |
| 21 | 283.8 | 1000 | 17.7 | 51.44 | 7.52 | 17.69 | High |

Figure 4:
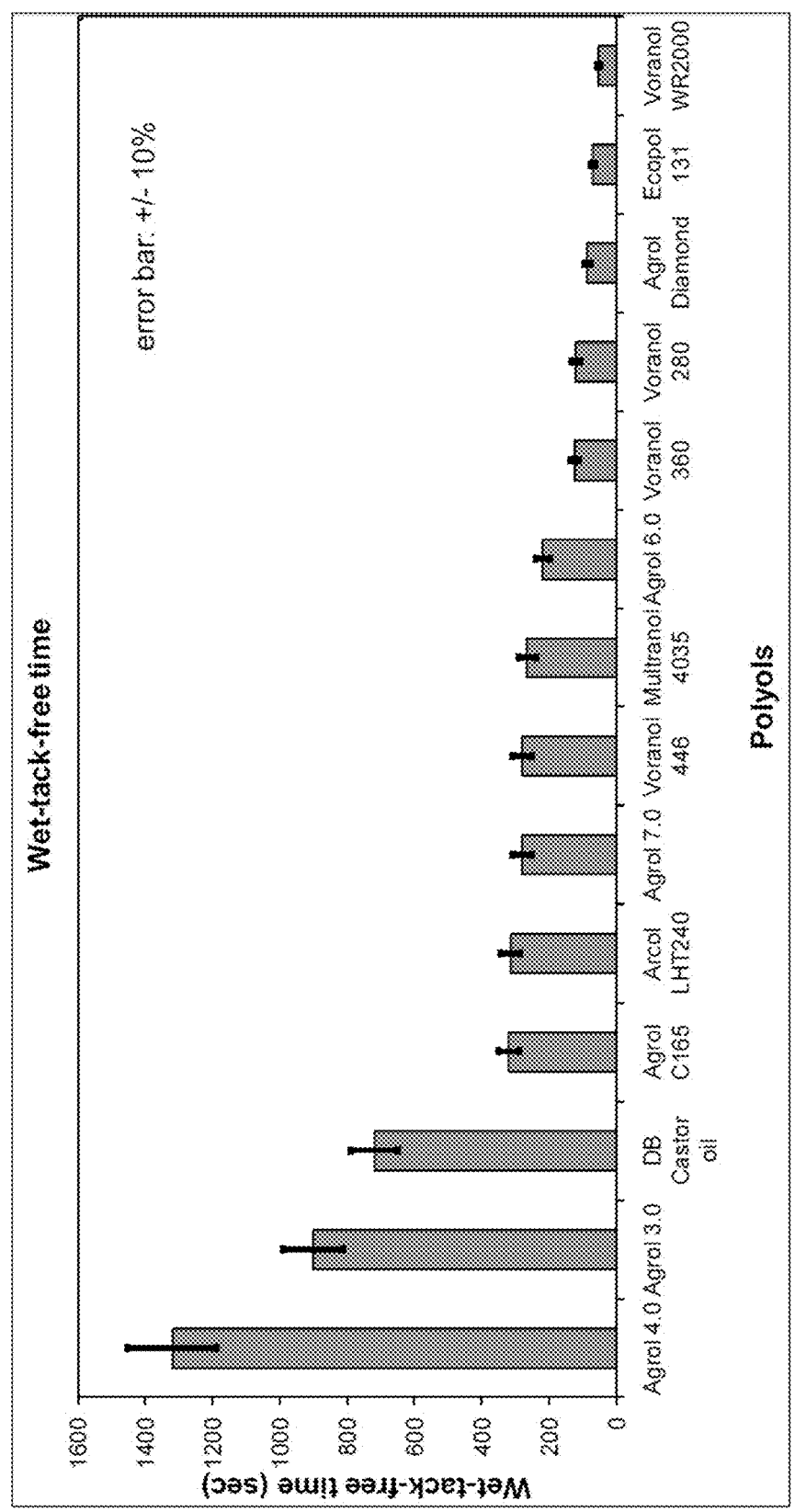
FIG. 4 is a graph illustrating the wet tack free times of polyurethanes containing fly ash filler using different polyols.
Figure 5:
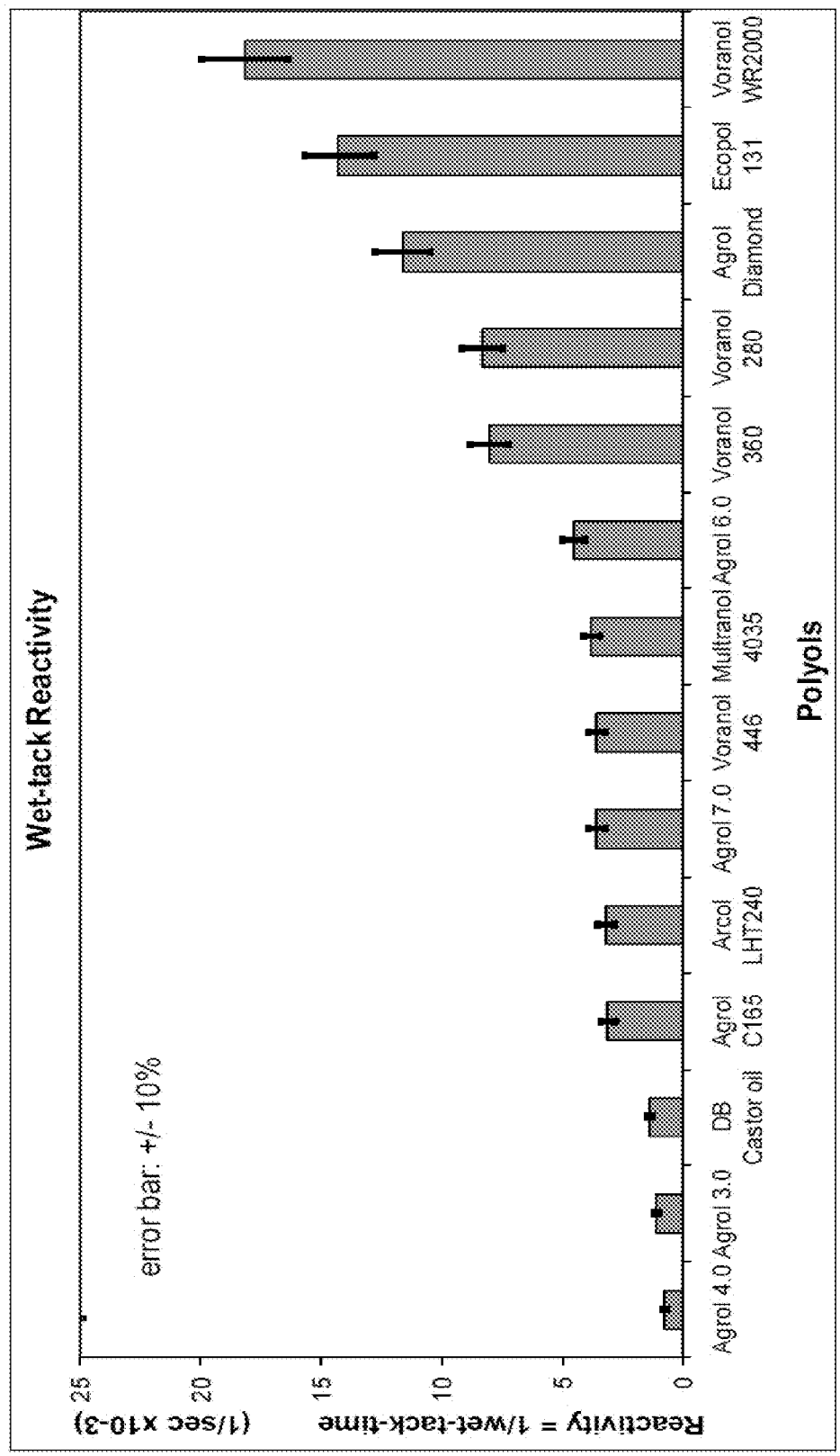
FIG. 5 is a graph illustrating the wet tack reactivity rates of polyurethanes containing fly ash filler using different polyols.

In Table 6, the shorter reaction times indicate a higher reactivity of the polyol. Among the parameters for assessing polyol reaction time, the wet tack free time has the highest accuracy. The wet tack free times were plotted for each polyol in FIG. 4. The reaction rate was calculated based upon the wet tack free times according to the following equation: 1/(wet tack free time). The reaction rates were plotted for each polyol with $(1/sec)*10^{-3}$ as the unit as shown in FIG. 5.

Figure 6:
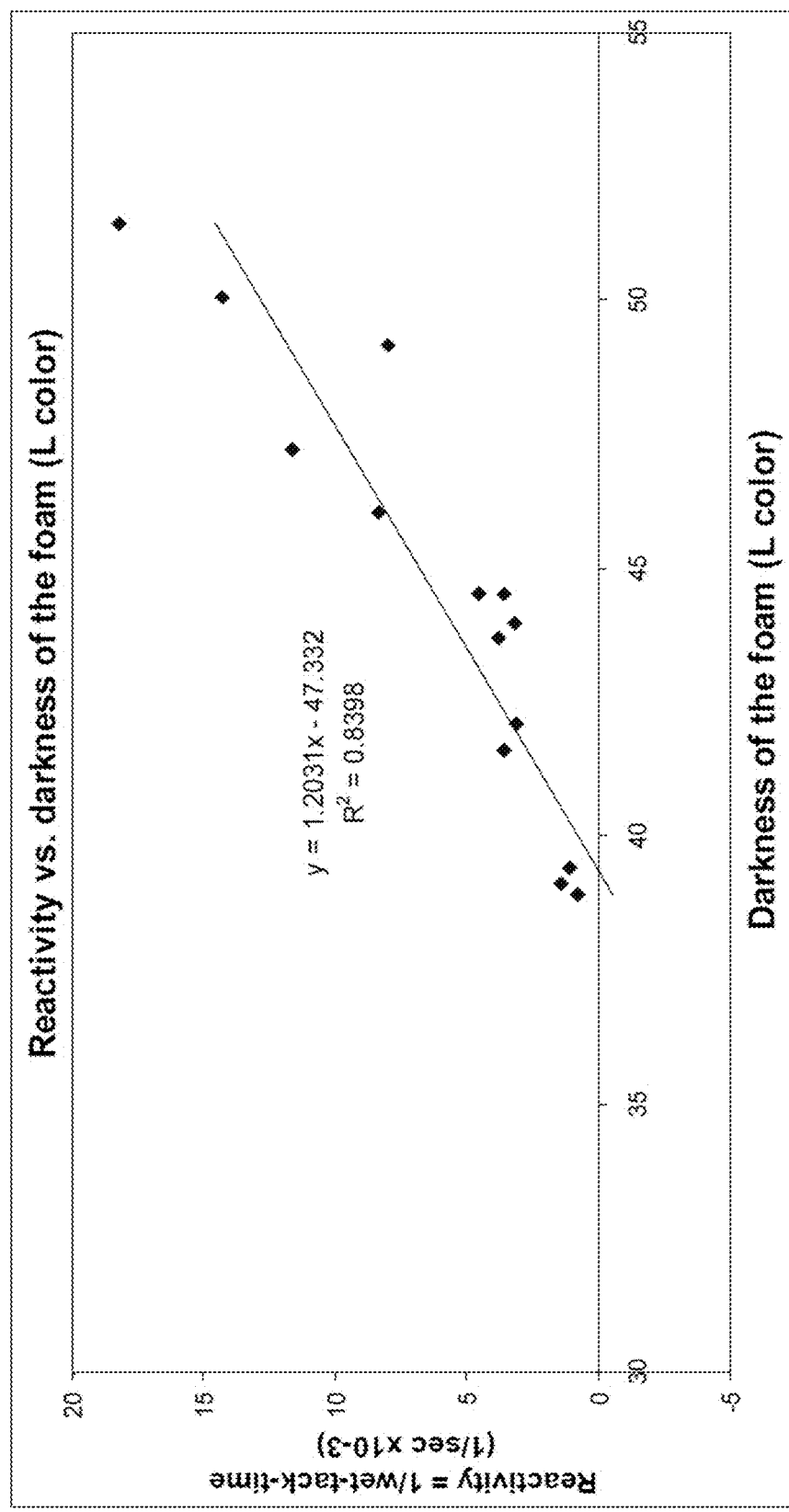
FIG. 6 is a graph illustrating the correlation between wet tack reactivity rates and foam darkness for polyurethanes using different polyols with fly ash filler.

The polyol reactivity correlates with the darkness of the foam derived from the polyol, as shown in FIG. 6. Generally, the polyols with higher reactivity result in lighter colored foams.

The composites and methods of the appended claims are not limited in scope by the specific composites and methods described herein, which are intended as illustrations of a few aspects of the claims and any composites and methods that are functionally equivalent are intended to fall within the scope of the claims. Various modifications of the composites and methods in addition to those shown and described herein are intended to fall within the scope of the appended claims. Further, while only certain representative composite materials and method steps disclosed herein are specifically described, other combinations of the composite materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed.

That which is claimed:

1. A method of preparing a composite material, comprising:
   mixing
   (1) at least one isocyanate selected from the group consisting of diisocyanates, polyisocyanates and mixtures thereof,
   (2) at least one polyol wherein the at least one polyol includes 70% or more of one or more first polyols, wherein each first polyol comprises a polyester or polyether polyol comprising 75% or more primary hydroxyl groups based on the total number of hydroxyl groups in the polyester or polyether polyol, wherein at least one of the one or more first polyols comprises an aromatic polyol,
(3) coal ash, and
(4) a catalyst
to produce a mixture; and
allowing the at least one isocyanate and the at least one polyol in the mixture to react in the presence of the coal ash and catalyst to form the composite material, wherein the mixture exhibits a cream time of at least 15 seconds and a wet tack free time of 125 seconds or less, as measured by ASTM 7487-08,
wherein the amount of coal ash added in the mixing step comprises from about 40% to about 90% by weight of the composite material.

2. The method of claim 1, wherein the aromatic polyol comprises an aromatic polyester polyol.

3. The method of claim 1, wherein the mixture exhibits a wet tack free time of 90 seconds or less, as measured by ASTM 7487-08.

4. The method of claim 1, wherein the composite material has a density of 20 lb/ft³ to 60 lb/ft³.

5. The method of claim 1, wherein the at least one isocyanate, the at least one polyol, the coal ash, and the catalyst are mixed in an extruder.

6. The method of claim 1, wherein the mixture is allowed to react in a continuous forming system.

7. The method of claim 1, wherein the at least one polyol includes from 70% to 85% of or more of one or more first polyols.

8. The method of claim 1, wherein the at least one polyol includes 75% or more of one or more first polyols.

9. The method of claim 8, wherein the at least one polyol includes greater than 90% of or more of one or more first polyols.

10. The method of claim 1, wherein one or more of the first polyols have a primary hydroxyl number, defined as the hydroxyl number multiplied by the percentage of primary hydroxyl groups based on the total number of hydroxyl groups in the polyol, of greater than 250 mg KOH/g.

11. The method of claim 1, wherein the one or more first polyols each have a primary hydroxyl number, defined as the hydroxyl number multiplied by the percentage of primary hydroxyl groups based on the total number of hydroxyl groups in the polyol, of greater than 250 mg KOH/g.

12. The method of claim 1, wherein one or more of the first polyols has a primary hydroxyl number of greater than 280 mg KOH/g.

13. The method of claim 12, wherein one or more of the first polyols has a hydroxyl number of greater than 300 mg KOH/g.

14. The method of claim 13, wherein one or more of the first polyols has a hydroxyl number of greater than 350 mg KOH/g.

15. The method of claim 1, wherein each first polyol when replacing the polyols used in the standard polyurethane formulation of the Brookfield Viscosity Test produces a Brookfield viscosity of over 50,000 mPa·s in less than 225 seconds.

16. The method of claim 15, wherein each first polyol when replacing the polyols used in the standard polyurethane formulation of the Brookfield Viscosity Test produces a Brookfield viscosity of over 50,000 mPa·s in less than 200 seconds.

17. The method of claim 16, wherein each first polyol when replacing the polyols used in the standard polyurethane formulation of the Brookfield Viscosity Test produces a Brookfield viscosity of over 50,000 mPa·s in less than 175 seconds.

18. The method of claim 1, wherein the at least one isocyanate, the at least one polyol, at least one catalyst, the coal ash, and any other components used to form the polyurethane when mixed together and used as the polyurethane in the Brookfield Viscosity Test produces a Brookfield viscosity of over 50,000 mPa·s in less than 225 seconds.

19. The method of claim 1, wherein the at least one isocyanate, at least one polyol, at least one catalyst, and any other non-filler additives when mixed together in the amounts used in the polyurethane without fly ash and any other fillers produce a surface temperature rise in a cup test of at least 120° F.

20. The method of claim 1, wherein the composite material is foamed.

21. The method of claim 1, wherein the coal ash is fly ash.

22. The method of claim 1, wherein the coal ash comprises from about 60% to about 85% by weight of the mixture.

23. The method of claim 1, further comprising mixing a crosslinker with the at least one isocyanate, the at least one polyol, the coal ash, and the catalyst.

24. The method of claim 23, wherein the crosslinker includes glycerin.

25. The method of claim 1, further comprising mixing fibers with the at least one isocyanate, the at least one polyol, the coal ash, and the catalyst.

26. The method of claim 1, wherein the at least one polyol further includes one or more second polyols, wherein each second polyol comprises 50% or less primary hydroxyl groups based on the total number of hydroxyl groups in the second polyol.

27. The method of claim 26, wherein one or more of the second polyols have a primary hydroxyl number, defined as the hydroxyl number multiplied by the percentage of primary hydroxyl groups based on the total number of hydroxyl groups in the polyol, of less than 200 mg KOH/g.

28. The method of claim 27, wherein one or more of the second polyols have a primary hydroxyl number, defined as the hydroxyl number multiplied by the percentage of primary hydroxyl groups based on the total number of hydroxyl groups in the polyol, of less than 150 mg KOH/g.

29. The method of claim 1, further comprising mixing a silicone surfactant with the at least one isocyanate, the at least one polyol, the coal ash, and the catalyst.

30. The method of claim 1, wherein the catalyst comprises an amine-containing catalyst.

31. The method of claim 1, wherein the composite material comprises a building material.

32. The method of claim 31, wherein the building material is selected from the group consisting of siding material, carpet backing, building panels, and roofing material.

* * * * *